US008111318B2

(12) United States Patent
Taniyama et al.

(10) Patent No.: US 8,111,318 B2
(45) Date of Patent: *Feb. 7, 2012

(54) IMAGING SYSTEM, IMAGING APPARATUS, PORTABLE TERMINAL APPARATUS, ONBOARD APPARATUS, MEDICAL APPARATUS AND METHOD OF MANUFACTURING THE IMAGING SYSTEM

(75) Inventors: Minoru Taniyama, Saitama (JP); Kazuya Yoneyama, Saitama (JP)

(73) Assignee: Fujinon Corporation, Saitama (JP)

( * ) Notice: Subject to any disclaimer, the term of this patent is extended or adjusted under 35 U.S.C. 154(b) by 522 days.

This patent is subject to a terminal disclaimer.

(21) Appl. No.: 12/328,627

(22) Filed: Dec. 4, 2008

(65) Prior Publication Data

US 2009/0147124 A1    Jun. 11, 2009

(30) Foreign Application Priority Data

Dec. 7, 2007   (JP) ................................ P2007-316928
Dec. 7, 2007   (JP) ................................ P2007-316929

(51) Int. Cl.
*G02B 13/16* (2006.01)
(52) U.S. Cl. ........................................ 348/335
(58) Field of Classification Search .................... 348/335
See application file for complete search history.

(56) References Cited

U.S. PATENT DOCUMENTS

| 5,307,175 | A  | * | 4/1994  | Seachman ..................... 358/401 |
| 6,545,714 | B1 | * | 4/2003  | Takada .......................... 348/340 |
| 6,902,273 | B2 | * | 6/2005  | Suzaki et al. ................. 351/177 |
| 6,984,206 | B2 | * | 1/2006  | Kumei et al. ................. 600/176 |
| 7,738,026 | B2 | * | 6/2010  | Cartlidge ...................... 348/340 |
| 2002/0118457 | A1 |  | 8/2002  | Dowski, Jr. |
| 2003/0122926 | A1 |  | 7/2003  | Kumei et al. |
| 2004/0165253 | A1 |  | 8/2004  | Cathey, Jr. et al. |
| 2004/0227822 | A1 | * | 11/2004 | Cartlidge et al. ........ 348/207.99 |
| 2005/0204329 | A1 |  | 9/2005  | Pauca et al. |
| 2007/0268376 | A1 |  | 11/2007 | Yoshikawa et al. |
| 2008/0007797 | A1 |  | 1/2008  | Hayashi et al. |
| 2008/0239088 | A1 | * | 10/2008 | Yamashita ................. 348/222.1 |
| 2009/0128654 | A1 | * | 5/2009  | Yoneyama ................. 348/222.1 |
| 2009/0128655 | A1 | * | 5/2009  | Yoneyama ................. 348/222.1 |
| 2009/0128665 | A1 | * | 5/2009  | Yoneyama ................. 348/240.3 |

(Continued)

FOREIGN PATENT DOCUMENTS

JP        2004-328506 A      11/2004

(Continued)

*Primary Examiner* — Rodney Fuller
(74) *Attorney, Agent, or Firm* — Birch, Stewart, Kolasch & Birch, LLP

(57) ABSTRACT

An imaging system is provided and includes an imaging lens and an imaging device such that the maximum diameter of an effective region of a point image covers three or more pixels of light receiving pixels, the point image being projected onto a light receiving surface through the imaging lens from an intended position. A signal processing unit executes restoration processing on first image data output from the imaging device, and the restoration processing is executed to generate second image data equivalent to the first image data output from the imaging device when the resolving power of the imaging lens is higher. The imaging lens has a first lens group having a positive power, and a second lens group having a positive power, in order from the object side.

32 Claims, 21 Drawing Sheets

U.S. PATENT DOCUMENTS

| | | | |
|---|---|---|---|
| 2009/0128668 A1* | 5/2009 | Yoneyama | 348/241 |
| 2009/0147097 A1* | 6/2009 | Sato et al. | 348/222.1 |
| 2009/0147124 A1* | 6/2009 | Taniyama et al. | 348/335 |
| 2009/0310000 A1* | 12/2009 | Hosokawa et al. | 348/241 |
| 2010/0074520 A1* | 3/2010 | Kinoshita | 382/167 |
| 2010/0328477 A1* | 12/2010 | Watanabe | 348/222.1 |
| 2011/0032410 A1 | 2/2011 | Shigemitsu et al. | |

FOREIGN PATENT DOCUMENTS

| | | |
|---|---|---|
| JP | 2006-519527 A | 8/2006 |
| JP | 2007-147951 A | 6/2007 |
| WO | WO 99/67743 A1 | 12/1999 |
| WO | WO 2004/063989 A2 | 7/2004 |
| WO | WO 2006/022373 A1 | 3/2006 |

\* cited by examiner

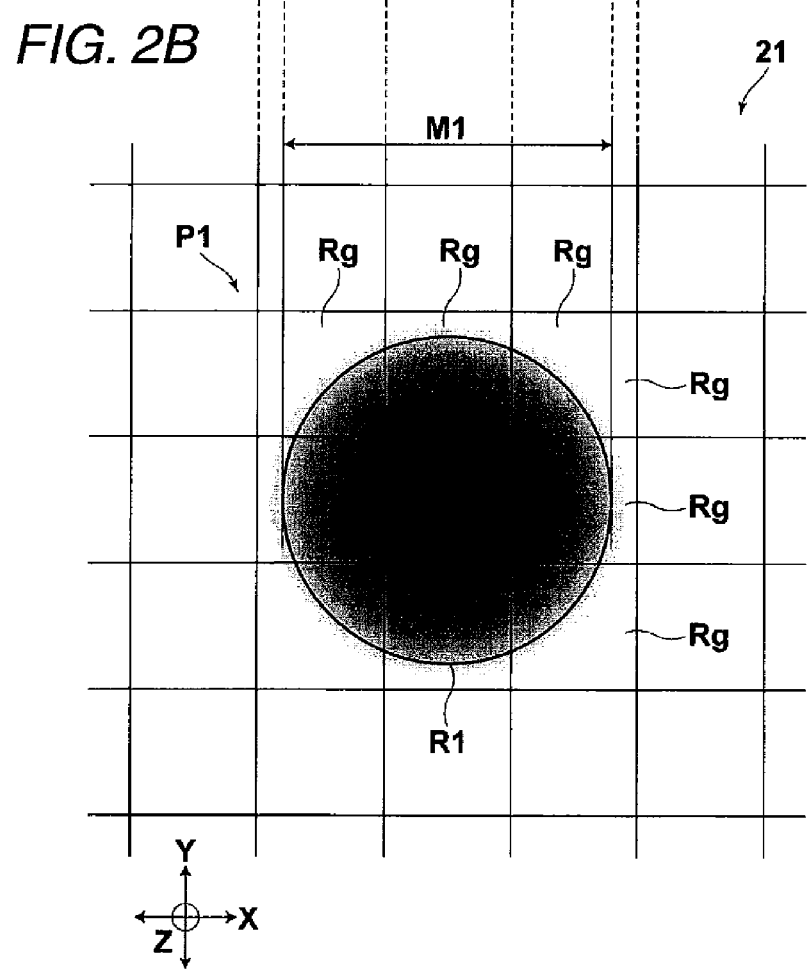

IMAGING SYSTEM, IMAGING APPARATUS, PORTABLE TERMINAL APPARATUS, ONBOARD APPARATUS, MEDICAL APPARATUS AND METHOD OF MANUFACTURING THE IMAGING SYSTEM

This application is based on and claims priority under 35 U.S.C §119 from Japanese Patent Application Nos. 2007-316928 and 2007-316929, both filed on Dec. 7, 2007, the entire disclosure of which is herein incorporated by reference.

BACKGROUND OF THE INVENTION

1. Field of the Invention

The present invention relates to an imaging system capable of improving the quality of image data obtained by imaging an optical image of a subject using restoration processing, an imaging apparatus including the imaging system, a portable terminal apparatus including the imaging system, an onboard apparatus including the imaging system, and a medical apparatus including the imaging system.

2. Description of Related Art

An imaging system that forms an optical image of a subject, which is focused on a light receiving surface Through an imaging lens, by using an imaging device, such as a CCD device or a CMOS device, having the light receiving surface on which a plurality of light receiving pixels are two-dimensionally arrayed is known.

In addition, an onboard camera or a portable cellular phone camera in which an imaging system having an imaging lens designed such that the depth of field increases is attached directly on a circuit board is known as an example of such an imaging system (refer to JP-A-2007-147951). Such an imaging system directly attached to a circuit board is designed to have a small device size since the size is limited.

In addition, an onboard camera or a portable cellular phone camera with high performance in which an imaging system, in which the number of light receiving pixels of an imaging device is increased and the resolving power of an imaging lens is improved, is mounted is also known. Among such onboard cameras or portable cellular phone cameras with high performance capable of obtaining high-resolution images, one in which the resolving power of an imaging lens is close to a diffraction limitation is also known.

On the other hand, it has been requested to further improve the resolution for an image obtained by using such an imaging system.

In order to improve the resolution of an image obtained by an imaging system, it is necessary to increase the number of light receiving pixels and to increase the resolving power of an imaging lens. That is, for example, by increasing the pixel density of light receiving pixels arrayed on a light receiving surface of an imaging device and increasing the resolving power of an imaging lens such that a point image projected onto the light receiving surface through the imaging lens falls within a range of one light receiving pixel, the resolution of the image obtained by using the imaging system can be improved.

Here, increasing the pixel density of light receiving pixels that form the imaging device without making the device size large may be realized relatively easily by an improvement in a technique in recent years.

On the other hand, it is very difficult to improve the resolving power of an imaging lens. That is, in order to improve the resolution of the imaging lens without making the size of the imaging lens large or making a depth of field small, it is necessary to suppress a shape error, an assembly error, and the like of each lens that forms the imaging lens. However, since there is an imaging lens the resolving power of which is already increased up to a level close to the diffraction limitation, there is a problem that it is very difficult to increase the resolving power by further improving manufacturing accuracy (for example, machining accuracy, assembly accuracy, and adjustment accuracy).

However, in manufacturing an imaging system having such an imaging lens capable of forming an image with high resolution, it is difficult to increase the yield due to difficulties in manufacture. That is, since image data allowing an image having an intended resolution to be formed cannot be generated, there is a possibility that many imaging systems will be out of a production line for readjustment or reassembly. In addition, an imaging system removed from the production line is reproduced such that image data capable of forming an image with the intended resolution can be generated by specifying the cause and performing modification.

However, there are various causes of reducing the resolution of an image expressed by image data output from an imaging system. For example, various causes, such as shape errors (surface shape error, thickness error, and eccentric error of a lens) of an individual lens used to form an imaging lens, assembly and adjustment errors of an imaging lens (shift error and tilt error of a lens and air space error between lenses), and a positional error of an imaging device with respect to an imaging lens, may be considered. For this reason, there is a problem that a cost is significantly increased for reproduction of an imaging system capable of generating high-quality image data, which allows an image with the intended resolution to be formed, by specifying a cause of the reduction in resolution and performing readjustment and reassembly.

SUMMARY OF THE INVENTION

An object of an illustrative, non-limiting embodiment of the invention is to provide an imaging system capable of improving the quality of image data obtained by imaging an optical image projected onto a light receiving surface, a method of manufacturing an imaging system, an imaging apparatus including the imaging system, a portable terminal apparatus including the imaging system, an onboard apparatus including the imaging system, and a medical apparatus including the imaging system.

According to a first aspect of the invention, there is provided an imaging system including:

an imaging lens;

an imaging device that has a light receiving surface on which a plurality of light receiving pixels are two-dimensionally arrayed and that forms first image data based on an optical image of a subject projected onto the light receiving surface through the imaging lens and outputs the first image data corresponding to the subject; and signal processing means for executing restoration processing on the first image data, the restoration processing being executed to generate second image data equivalent to the first image data output from the imaging device when the resolving power of the imaging lens is higher.

The imaging lens includes in order from an object side thereof, a first lens group including at least one lens and having a positive power, and a second lens group including at least one lens and having a positive power. The imaging lens and the imaging device are constructed such that a maximum diameter of an effective region of a point image, which is projected onto the light receiving surface through the imaging lens from any position of X, Y, and Z directions, becomes a size covering three or more pixels of the light receiving pixels.

The imaging lens may be constructed such that the imaging lens is constructed such that a value of MTF characteristics is positive, the MTF corresponding to an optical image of a subject, which is projected onto the light receiving surface through the imaging lens, and the subject is located at any position of X, Y, and Z directions distant ten times or more of a focal length from the imaging lens.

The signal processing means may perform the restoration processing in a condition where a pixel region covering total nine or more pixels including three or more pixels in a vertical direction and three or more pixels in a horizontal direction on the light receiving surface is set as a minimum unit or may perform the restoration processing with a minimum pixel region, which includes the entire effective region of the point image projected onto the light receiving surface, as a minimum unit.

The signal processing means may execute the restoration processing such that the size of the effective region of the point image in an image expressed by the second image data is smaller than the size of the effective region of the point image in an image expressed by the first image data.

The signal processing means may execute the restoration processing using a restoration coefficient corresponding to a state of the point image expressed by the first image data.

The restoration coefficient may be individually calculated for each corresponding imaging system, may be selected corresponding to a state of the point image expressed by the first image data among candidates of each restoration coefficient corresponding to each of states of point images classified into a plurality of types, or may be obtained by further correction of a restoration coefficient, which is selected corresponding to a state of the point image expressed by the first image data, among candidates of a plurality of types of restoration coefficients corresponding to each of states of point images classified into a plurality of types.

The imaging system may further include a restoration coefficient acquisition means for acquiring the restoration coefficient.

According to a second aspect of the invention, there is provided an imaging system including:

an imaging lens;

an imaging device that has a light receiving surface on which a plurality of light receiving pixels are two-dimensionally arrayed and that forms first image data on an optical image of a subject projected onto the light receiving surface through the imaging lens and outputs the first image data corresponding to the subject;

coefficient storage means for being configured to store a restoration coefficient corresponding to a state of a point image, which is projected onto the light receiving surface through the imaging lens and is expressed by the first image data output from the imaging device, when a maximum diameter of an effective region of the point image is a size covering three or more pixels; and signal processing means for executing restoration processing on the first image data by using the restoration coefficient, the restoration processing being executed to generate second image data equivalent to the first image data output from the imaging device when the resolving power of the imaging lens is higher.

The signal processing means performs the restoration processing in a condition where a pixel region covering total nine or more pixels including three or more pixels in a vertical direction and three or more pixels in a horizontal direction on the light receiving surface is set as a minimum unit. The imaging lens includes in order from an object side thereof, a first lens group including at least one lens and having a positive power, and a second lens group including at least one lens and having a positive power.

The "coefficient storage means being configured to store a restoration coefficient" means that the coefficient storage means will store a restoration coefficient.

The coefficient storage means may store a restoration coefficient individually calculated for each corresponding imaging system.

In addition, the coefficient storage means may store a restoration coefficient which is selected corresponding to a state of the point image expressed by the first image data among candidates of restoration coefficients corresponding to respective states of point images classified into a plurality of types.

In addition, the coefficient storage means may store a correction-completed restoration coefficient obtained by further correction of a restoration coefficient, which is selected corresponding to a state of the point image expressed by the first image data among candidates of a plurality of types of restoration coefficients corresponding to respective states of point images classified into a plurality of types, according to a state of the point image.

The imaging system may further include restoration coefficient acquisition means for acquiring the restoration coefficient and storing the acquired restoration coefficient in the coefficient storage means.

The signal processing means may execute the restoration processing with a minimum pixel region, which includes the entire effective region of the point image projected onto the light receiving surface, as a minimum unit.

The signal processing means may execute the restoration processing such that the size of the effective region of the point image in an image expressed by the second image data is smaller than the size of the effective region of the point image in an image expressed by the first image data.

In the first and second aspects, the imaging lens may be configured to include two single lenses.

The single lens in the first lens group may have a meniscus shape with a convex surface toward on the object side, and the single lens in the second lens group may have a meniscus shape with a convex surface toward on the object side.

The single lens in the first lens group may have a biconvex shape, and the single lens in the second lens group may have a meniscus shape with a convex surface toward on the image side.

There may be provided an imaging apparatus including the imaging system according to the first or second aspect of the invention.

There may be provided a portable terminal apparatus including the imaging system according to the first or second aspect of the invention.

There may be provided an onboard apparatus including the imaging system according to the first or second aspect of the invention.

There may be provided a medical apparatus including the imaging system according to the first or second aspect of the invention.

According to a third aspect of the invention, there is provided an imaging system including:

an imaging lens;

an imaging device that has a light receiving surface on which a plurality of light receiving pixels are two-dimensionally arrayed and that forms first image data on an optical image of a subject projected onto the light receiving surface through the imaging lens and outputs the first image data corresponding to the subject;

coefficient storage means storing a restoration coefficient corresponding to a state of a point image, which is projected onto the light receiving surface through the imaging lens and is expressed by the first image data output from the imaging device, when a maximum diameter of an effective region of the point image is a size covering three or more pixels; and signal processing means for executing restoration processing on the first image data by using the restoration coefficient, the restoration processing being executed to generate second image data equivalent to the first image data output from the imaging device when the resolving power of the imaging lens is high.

The signal processing means performs the restoration processing in a condition where a pixel region covering total nine or more pixels including three or more pixels in a vertical direction and three or more pixels in a horizontal direction on the light receiving surface is set as a minimum unit. The imaging lens includes in order from an object side thereof, a first lens group including at least one lens and having a positive power, and a second lens group including at least one lens and having a positive power.

According to another aspect of the invention, there is provided a method of manufacturing an imaging system of the third aspect of the invention, including projecting the point image onto the light receiving surface of the imaging device through the imaging lens to cause the coefficient storage means to store the restoration coefficient corresponding to a state of the point image expressed by the first image data output from the imaging device.

The restoration coefficient may be individually calculated for each corresponding imaging system.

The restoration coefficient may be selected corresponding to a state of the point image expressed by the first image data among candidates of restoration coefficients corresponding to respective states of point images classified into a plurality of types.

In addition, the restoration coefficient may be obtained by further correction of a restoration coefficient, which is selected corresponding to a state of the point image expressed by the first image data among candidates of a plurality of types of restoration coefficients corresponding to each of states of point images classified into a plurality of types, according to a state of the point image.

In each of the aspects of the invention, the maximum diameter of the effective region of the point image projected onto the light receiving surface may be assumed as a diameter of the effective region in a direction in which the effective region of the point image projected onto the light receiving surface includes a largest number of light receiving pixels, and the "configuration in which the maximum diameter of the effective region of the point image is a size covering three or more pixels" may be assumed as a "configuration in which the effective region has a size covering three or more pixels of light receiving pixels in a direction in which the effective region of the point image includes a largest number of light receiving pixels".

The "effective region of a point image" means a region having a light intensity of $1/e^2$ (about 13.5%) of a peak intensity in the light intensity distribution indicating the point image.

In addition, image restoration processing disclosed in paragraphs ([0002] to [0016]) of JP-A-2000-123168 may be adopted as the "restoration processing". Moreover, in execution of the restoration processing, a technique disclosed in Non-patent Document "title "Kernel Wiener Filter", Yoshikazu Washizawa and Yukihiko Yamashita, 2003 Workshop on Information-Based Induction Sciences, (IBIS2003), Kyoto, Japan, Nov. 11-12, 2003", which will be described, may be applied.

In addition, the "position distant ten times or more of a focal length of an imaging lens" means a "position distant ten times or more of the focal length toward the subject along the optical-axis direction (Z-axis direction) of the imaging lens from a reference position when a position, at which one of lens surfaces forming the imaging lens closest to the subject side and the optical axis of the imaging lens cross each other, is set as the reference position".

BRIEF DESCRIPTION OF THE DRAWINGS

The features of the invention will appear more fully upon consideration of the exemplary embodiment of the invention, which are schematically set forth in the drawings, in which:

FIG. 2A is a view showing the light intensity distribution of a point image, and FIG. 2B is a view showing a point image projected onto a light receiving surface;

FIG. 17A is a view showing a change in a value of MTF characteristics in a spatial frequency of 20 line/mm, FIG. 17B is a view showing a change in a value of MTF characteristics in a spatial frequency of 30 line/mm, FIG. 17C is a view showing a change in a value of MTF characteristics in a spatial frequency of 40 line/mm, and FIG. 17D is a view showing a change in a value of MTF characteristics in a spatial frequency of 50 line/mm;

FIG. 20A is a view showing a change in a value of MTF characteristics in a spatial frequency of 20 line/mm, FIG. 20B is a view showing a change in a value of MTF characteristics in a spatial frequency of 30 line/mm, FIG. 20C is a view showing a change in a value of MTF characteristics in a spatial frequency of 40 line/mm, and FIG. 20D is a view showing a change in a value of MTF characteristics in a spatial frequency of 50 line/mm;

DETAILED DESCRIPTION OF THE EXEMPLARY EMBODIMENTS

Figure 1:
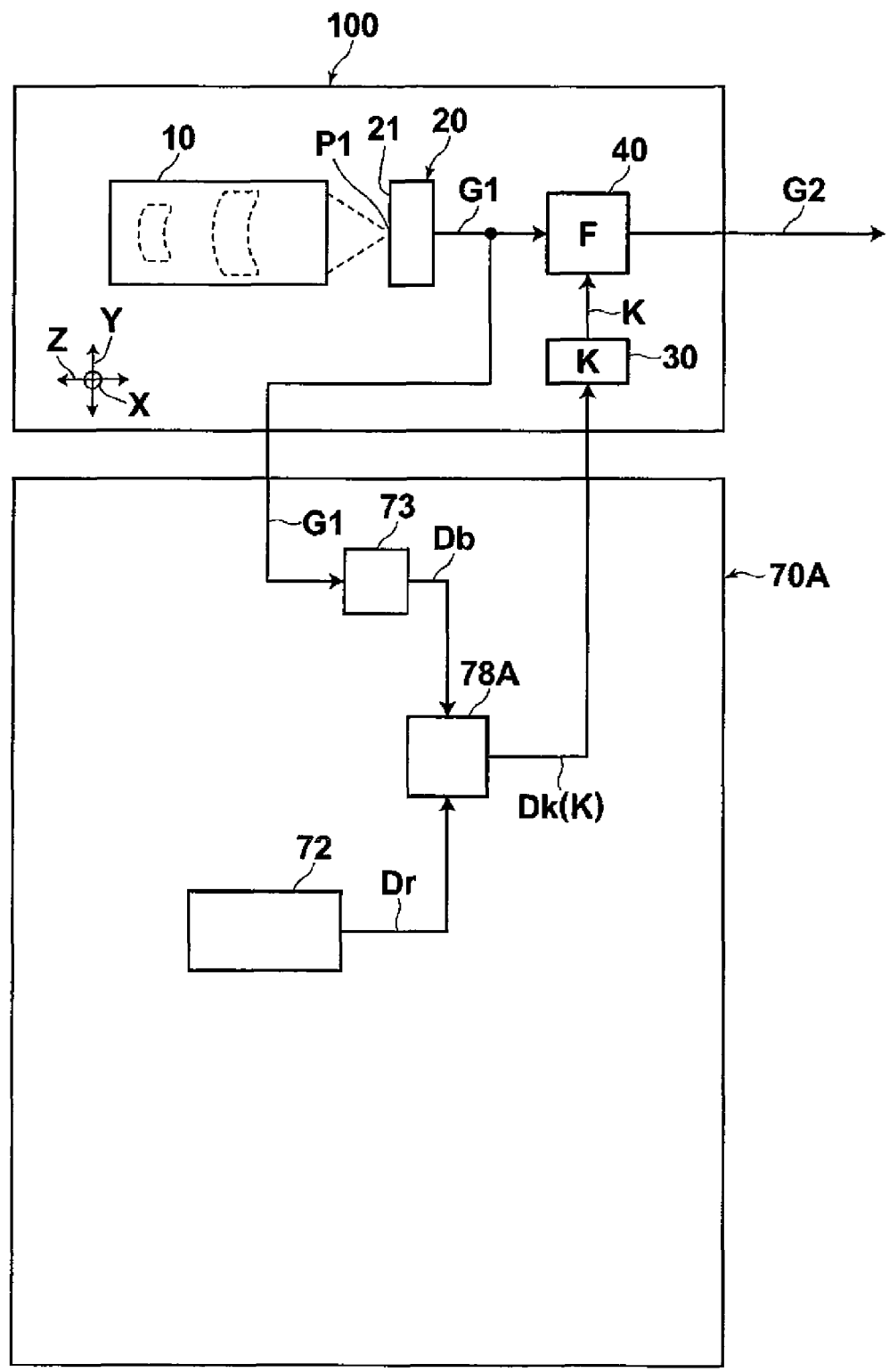
FIG. 1 is a block diagram showing a schematic configuration of an imaging system of the invention.

In an imaging system according to a first aspect of the invention, the imaging lens includes in order from an object side thereof, a first lens group including at least one lens and having a positive power, and a second lens group including at least one lens and having a positive power, and the imaging lens and the imaging device are constructed such that a maximum diameter of an effective region of a point image projected onto the light receiving surface through the imaging lens from an intended position becomes a size covering three or more pixels of the light receiving pixels. Further, the restoration processing for generating the second image data equivalent to the first image data output from the imaging device when the resolving power of the imaging lens is high is executed on the first image data output from the imaging device. Therefore, the quality of image data obtained by imaging an optical image projected onto the light receiving surface can be easily improved.

That is, in the imaging system according to the first aspect of the invention, utilizing an imaging lens with low resolving power, an image equivalent to an image obtained by imaging an optical image projected through an imaging lens with resolving power higher than the imaging lens can be obtained. For example, the effective region of the point image projected through the imaging lens covers total nine pixels including tree pixels in the vertical direction and three pixels in the horizontal direction on the light receiving surface. In addition, since the restoration processing for generating the second image data equivalent to the first image data (that is, first image data output from the imaging device when the resolving power of the imaging lens is high) output from the imaging device when the effective region of the point image is settled in a region of one pixel on the light receiving surface, for example, is executed on the first image data output from the imaging device by imaging the point image covering total nine pixels, the second image data expressing the same image can be obtained with higher resolution than that of an image expressed by the first image data.

Furthermore, in the imaging system, the restoration processing can also be executed on an optical image projected onto the light receiving surface through the imaging lens from any position. Accordingly, the resolution of the entire image expressed by the first image data can be improved. That is, the resolution of any region in the image expressed by the second image data can be made higher than that of the image expressed by the first image data.

Thus, unlike the related art, the quality of image data can be more easily improved as compared with a case of increasing the resolving power of an imaging lens by improving manufacturing accuracy (for example, machining accuracy, assembly accuracy, and adjustment accuracy) of an imaging system.

Furthermore, when the imaging lens is made to be constructed such that a value of MTF characteristics of an optical image of a subject, which is projected onto the light receiving surface through the imaging lens from any position of X, Y, and Z directions distant ten times or more of a focal length of the imaging lens, is a positive value, the quality of the first image data expressing the subject at the position distant ten times or more of the focal length of the imaging lens can be improved more reliably.

Furthermore, when the signal processing means is made to perform the restoration processing in a condition where a pixel region covering total nine or more pixels including three or more pixels in the vertical direction and three or more pixels in the horizontal direction on the light receiving surface is set as a minimum unit, the restoration processing can be performed more reliably.

Furthermore, when the signal processing means is made to execute the restoration processing with a minimum pixel region, which includes the entire effective region of the point image projected onto the light receiving surface, as a minimum unit, it is possible to suppress an increase in amount of operation in the restoration processing and to efficiently execute the restoration processing.

In addition, when the signal processing means is made to execute the restoration processing such that the size of the effective region of the point image in an image expressed by the second image data is smaller than the size of the effective region of the point image in an image expressed by the first image data, the quality of image data can be improved more reliably.

Here, when the signal processing means is made to execute the restoration processing by using a restoration coefficient corresponding to a state (hereinafter, referred to as a "blur state of a point image) of a point image in an image expressed by the first image data, the second image data obtained by correcting the blur state of the point image more accurately can be acquired. As a result, the quality of image data can be improved more reliably.

In addition, the reason why the "state of a point image" is called the "blur state of a point image" is that the image quality of a point image projected onto the light receiving surface Through the imaging lens and the image quality of a point image expressed by the first image data obtained by imaging the point image deteriorate a little due to an influence of lens aberration and the like as compared with a subject which becomes an object point corresponding to the point image. That is, for example, assuming that a subject is a resolving power chart, the resolution of an image of the resolving power chart projected onto a light receiving surface through an imaging lens and the resolution of an image of the resolving chart expressed by the first image data obtained by imaging the image of the resolving power chart become lower than the resolution of the resolving power chart that becomes the subject. In addition, the "state of a point image" or the "blur state of a point image" mainly indicates a degradation state of the resolution of the point image.

Furthermore, when the restoration coefficient is individually calculated for each corresponding imaging system, the restoration coefficient which can improve the quality of image data can be calculated more accurately.

In addition, when the restoration coefficient is selected corresponding to a blur state of a point image expressed by the first image data among candidates of each restoration coefficient corresponding to each of blur states of point images classified into a plurality of types, the restoration coefficient can be acquired more easily compared with the case in which a restoration coefficient is individually calculated for each corresponding imaging system.

In addition, when the restoration coefficient is obtained by correcting a restoration coefficient which is selected corresponding to a blur state of the point image expressed by the first image data among candidates of a plurality of types of restoration coefficients corresponding to each of blur states of point images classified into a plurality of types, the restoration coefficient can be acquired more easily while suppressing a reduction in accuracy in calculating the restoration coefficient compared with the case in which a restoration coefficient is individually calculated for each imaging system.

In addition, when the imaging system is made to include the restoration coefficient acquisition means for acquiring the restoration coefficient, the restoration coefficient can be acquired more reliably.

An imaging system according to a second aspect of the invention includes: the coefficient storage means for being configured to store a restoration coefficient corresponding to a state (hereinafter, referred to as a blur state of a point image) of a point image, which is projected onto the light receiving surface through the imaging lens and is expressed by the first image data output from the imaging device, when a maximum diameter of an effective region of the point image is a size covering three or more pixels; and the signal processing means for executing restoration processing on the first image data by utilizing the restoration coefficient, the restoration processing being executed to generate second image data equivalent to the first image data output from the imaging device when the resolving power of the imaging lens is higher. In addition, the signal processing means performs the restoration processing in a condition where a pixel region covering total nine or more pixels including three or more pixels in a vertical direction and three or more pixels in a horizontal direction on the light receiving surface is set as a minimum unit, and the imaging lens includes in order from an object side thereof, a first lens group including at least one lens and having a positive power, and a second lens group including at least one lens and having a positive power. Therefore, by storing the restoration coefficient in the coefficient storage means, restoration processing utilizing the restoration coefficient can be executed. As a result, the quality of image data obtained by imaging an optical image projected onto the light receiving surface can be easily improved.

That is, when the resolution of an image expressed by the first image data output from the imaging system does not reach an intended level, it is not necessary to specify the cause and readjust or reassemble the imaging lens unlike the related art. That is, the second image data that expresses an image having an intended resolution can be obtained only by storing a restoration coefficient corresponding to a blur state of a point image imaged in the imaging system in the coefficient storage means and performing restoration processing (image processing) on the first image data. As a result, the quality of image data obtained by imaging an optical image projected onto the light receiving surface can be easily improved.

In addition, as described above, the "state of a point image" is also called a "blur state of a point image".

Furthermore, when the coefficient storage means is made to store a restoration coefficient individually calculated for each corresponding imaging system, the restoration coefficient can be calculated more accurately and the restoration processing can be executed more accurately. Accordingly, the quality of image data obtained by imaging an optical image projected onto the light receiving surface can be improved more reliably.

In addition, when the coefficient storage means is made to store a restoration coefficient which is selected corresponding to a blur state of a point image expressed by the first image data among candidates of each restoration coefficient corresponding to each of blur states of point images classified into a plurality of types, the restoration coefficient can be set more easily compared with a case in which a restoration coefficient is individually calculated for each corresponding imaging system.

Here, when the coefficient storage means is made to store a correction-completed restoration coefficient obtained by correcting a restoration coefficient, which is selected corresponding to a blur state of the point image expressed by the first image data among candidates of a plurality of types of restoration coefficients corresponding to each of blur states of point images classified into a plurality of types, according to a blur state of the point image, the restoration coefficient can be acquired more easily while suppressing a reduction in resolution in calculating the restoration coefficient compared with a case in which a restoration coefficient is individually calculated for each corresponding imaging system.

Furthermore, when the imaging system is made to include the restoration coefficient acquisition means for acquiring the restoration coefficient and storing the acquired restoration coefficient in the coefficient storage means, the restoration coefficient can be acquired more reliably.

Furthermore, when the signal processing means is made to execute the restoration processing with a minimum pixel region, which includes the entire effective region of the point image projected onto the light receiving surface, as a minimum unit, it is possible to suppress an increase in amount of operation for executing the restoration processing and to efficiently execute the restoration processing.

Furthermore, when the signal processing means is made to execute the restoration processing such that the size of the effective region of the point image in an image expressed by the second image data is smaller than the size of the effective region of the point image in an image expressed by the first image data, the quality of image data obtained by imaging an optical image projected onto the light receiving surface can be improved more reliably.

In addition, when the imaging lens is made to include only two single lenses, the single lens of the first lens group is made to have a meniscus shape toward a convex surface on the object side, and the single lens of the second lens group is made to have a meniscus shape toward a convex surface on the object side, the quality of the first image data expressing a subject can be improved more reliably.

Further, when the single lens of the first lens group is made to have a biconvex shape and the single lens of the second lens group is made to a meniscus shape toward a convex surface on the image side, telecentricity of the imaging lens can be improved more reliably.

Since each of the imaging apparatus, portion terminal apparatus, onboard apparatus, medical apparatus according to the aspects of the invention includes the imaging system according to the first or second aspect of the invention, the quality of image data obtained by imaging an optical image projected onto a light receiving surface can be improved more reliably as described above.

An imaging system according to a third aspect of the invention includes: the coefficient storage means storing a restoration coefficient corresponding to a state of a point image, which is projected onto the light receiving surface through the imaging lens and is expressed by the first image data output from the imaging device, when a maximum diameter of an effective region of the point image is a size covering three or more pixels; and the signal processing means for executing restoration processing on the first image data by utilizing the restoration coefficient, the restoration processing being executed to generate second image data equivalent to the first image data output from the imaging device when the resolving power of the imaging lens is higher. In addition, the signal processing means performs the restoration processing in a condition where a pixel region covering total nine or more pixels including three or more pixels in a vertical direction and three or more pixels in a horizontal direction on the light receiving surface is set as a minimum unit, and the imaging lens includes in order from an object side thereof a first lens group including at least one lens and having a positive power, and a second lens group including at least one lens and having a positive power. Therefore, the quality of image data obtained by imaging an optical image projected onto the light receiving surface can be easily improved, as in the above second aspect.

In a method of manufacturing the imaging system of the above third aspect the point image is projected onto the light receiving surface of the imaging device through the imaging lens and a restoration coefficient corresponding to a state of the point image expressed by the first image data output from the imaging device is stored in the coefficient storage means in the method of manufacturing an imaging system. As a result, the imaging system according to the second aspect of the invention can be manufactured efficiently.

For example, even if the resolving power of an image expressed by image data output from the imaging system does not reach an intended level due to a manufacturing problem, reproduction processing of the imaging system for increasing the resolving power of an image can be easily executed compared with that in the relate art. That is, since restoration processing for increasing the quality of image data output from the imaging system can be easily executed by the imaging system in which a restoration coefficient is stored in the coefficient storage means, an imaging system in which the resolving power of an image does not reach an intended level can be reproduced as one in which the resolving power of an image with the intended level can be easily obtained. Thus, an imaging system can be manufactured efficiently.

In addition, in the case of producing the imaging system in large quantities, a larger effect of manufacturing the imaging system efficiently can be obtained.

Hereinafter, exemplary embodiments of the invention will be described with reference to the accompanying drawings.

First Embodiment

FIG. 1 is a block diagram illustrating the schematic configuration of an imaging system according to a first embodiment of the invention.

<Regarding the Configuration of an Imaging System>

Hereinafter, the configuration of an imaging system according to the first embodiment will be described.

An imaging system 100 of the invention shown in FIG. 1 includes: an imaging lens 10; an imaging device 20 which has a light receiving surface 21 on which a plurality of light receiving pixels are two-dimensionally arrayed and which forms an optical image P1 of a subject projected onto the light receiving surface 21 through the imaging lens 10 and outputs first image data G1 expressing the subject; and a signal processing unit 40 that executes restoration processing on the first image data G1, the restoration processing being executed to generate second image data G2 equivalent to the first image data G1 output from the imaging device 20 when the resolving power of the imaging lens 10 is high.

The imaging lens 10 has a first lens group which includes at least one lens and has positive power, and a second lens group which includes at least one lens and has positive power, in order from a subject side (object side).

The imaging lens 10 and the imaging device 20 are configured such that the maximum diameter of an effective region of a point image P1 becomes a size covering three or more pixels of light receiving pixels, the point image P1 being projected onto the light receiving surface 21 through the imaging lens 10 from any position of X, Y, and Z directions.

Here, the maximum diameter of the effective region of the point image projected onto the light receiving surface 21 is a diameter of the effective region of the point image P1 in a direction in which the effective region of the point image P1 projected onto the light receiving surface 21 includes a largest number of light receiving pixels.

In addition, a direction indicated by arrow Z in FIG. 1 is a direction of an optical axis of the imaging lens 10, and directions indicated by arrows X and Y are directions parallel to the light receiving surface 21.

A restoration coefficient acquisition apparatus 70A which acquires a restoration coefficient K corresponding to a blur state of the point image P1 expressed by the first image data G1 output from the imaging device 20 is provided outside the imaging system 100. The signal processing unit 40 executes restoration processing F using the restoration coefficient K acquired by the restoration coefficient acquisition apparatus 70A.

Here, the imaging system 100 includes a coefficient storage unit 30 that stores the restoration coefficient K acquired by the restoration coefficient acquisition apparatus 70A. However, the coefficient storage unit 30 may also be provided in the signal processing unit 40. Moreover, the coefficient storage unit 30 does not necessarily need to be provided in the imaging system 100.

The restoration coefficient acquisition apparatus 70A includes: an ideal point image storage unit 72 that stores data Dr, which is either design data regarding a point image when there is no error in an optical system including the imaging lens 10 or ideal point image state data regarding an ideal point image state exceeding it, beforehand; a point image blur state acquisition unit 73 that acquires blurred point image state data Db indicating a blur state of the point image P1 expressed by the first image data G1 output from the imaging device 20;

and a restoration coefficient acquisition unit 78A that is input with the blurred point image state data Db indicating the blur state of the point image P1 acquired in the point image blur state acquisition unit 73 and the data Dr which is design data or ideal point image state data stored in the ideal point image storage unit 72, acquires coefficient data Dk indicating the restoration coefficient K corresponding to the blur state of the point image P1 expressed by the first image data G1 by an operation using both the blurred point image state data Db and the data Dr, and makes the restoration coefficient K indicated by the coefficient data Dk stored in the coefficient storage unit 30.

In addition, an imaging lens used in the imaging system (including a second embodiment described below) of the invention may be adopted even if an optical image is "not focused" correctly on a light receiving surface through the imaging lens without being limited to a case where the optical image is "focused" correctly on the light receiving surface necessarily through the imaging lens. Therefore, in the invention, an explanation will be made assuming that an optical image is "projected" on a light receiving surface through an imaging lens. The state "not focused" is considered as a so-called blurred image. For example, a state where a point image wider than an original point image due to a manufacturing error is generated or a situation where only a point image a design value of which is larger than that of a point image to be originally acquired due to design constraint (size or cost of an optical system) is also included.

In addition, the blurred point image state data Db mainly indicating a degradation state of the resolution of a point image as described above may be set to indicate the size of an effective region of the point image P1 or the brightness distribution (concentration distribution of an image) on the light receiving surface of the point image P1, for example.

<Regarding an Operation of an Imaging System>

Next, an operation of the above imaging system will be described.

First, an example of a case where a restoration coefficient is calculated by a restoration coefficient acquisition apparatus and the restoration coefficient is stored in a coefficient storage unit will be described.

An optical image of a subject projected onto the light receiving surface 21 through the imaging lens 10 is imaged by the imaging device 20, and the first image data G1 indicating the subject output from the imaging device 20 is input to the point image blur state acquisition unit 73.

The point image blur state acquisition unit 73 to which the first image data G1 has been input analyzes a blur state of a point image expressed by the first image data G1 and outputs the blurred point image state data Db indicating the analysis result.

The restoration coefficient acquisition unit 78A is input with the blurred point image state data Db output from the point image blur state acquisition unit 73 and the data Dr which is design data or ideal point image state data stored beforehand in the ideal point image storage unit 72, acquires the restoration coefficient K corresponding to the blur state of the point image P1 by an operation using both the blurred point image state data Db and the data Dr, and outputs the coefficient data Dk indicating the restoration coefficient K.

The coefficient data Dk indicating the restoration coefficient K output from the restoration coefficient acquisition unit 78A is input to the coefficient storage unit 30, such that the restoration coefficient K indicated by the coefficient data Dk is stored in the coefficient storage unit 30.

In addition, a DxO analyzer made by DxO Labs (France), which will be described later, may be mentioned as an example of realizing a function of the point image blur state acquisition unit 73. In the DxO analyzer, a blur state of the point image P1 projected onto the light receiving surface 21 may be acquired by analyzing the first image data G1 output from the imaging device 20.

<Regarding Restoration Processing>

Next, a case in which second image data that expresses an image with higher resolution than an image expressed by first image data is acquired by executing the restoration processing F on the first image data output from the imaging device 20 using the restoration coefficient K stored in the coefficient storage unit 30 will be described. Moreover, in the following explanation, a case in which the restoration processing F is performed on the first image data expressing a point image will be mainly described.

Figure 3A:
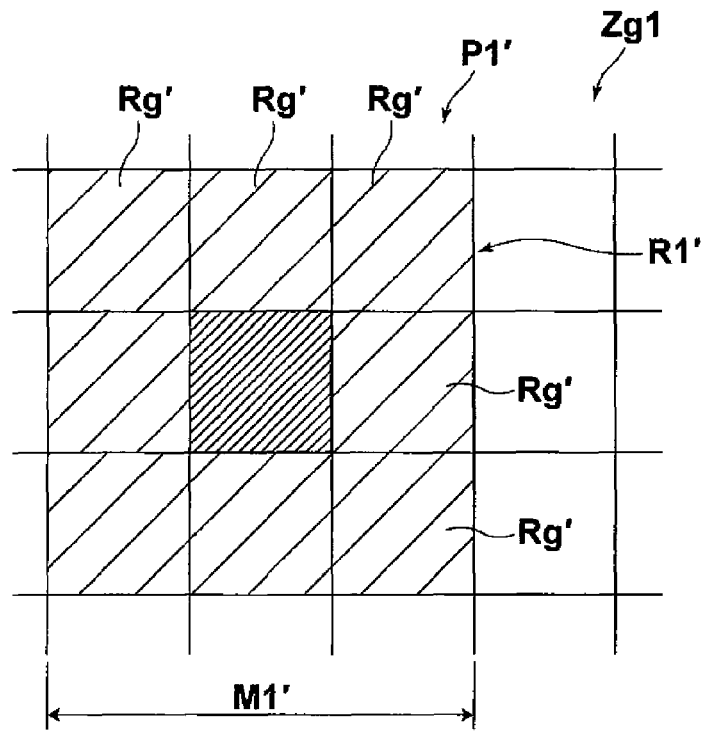
FIG. 3A is a view showing an image of a point image displayed in an image expressed by first image data.
Figure 3B:
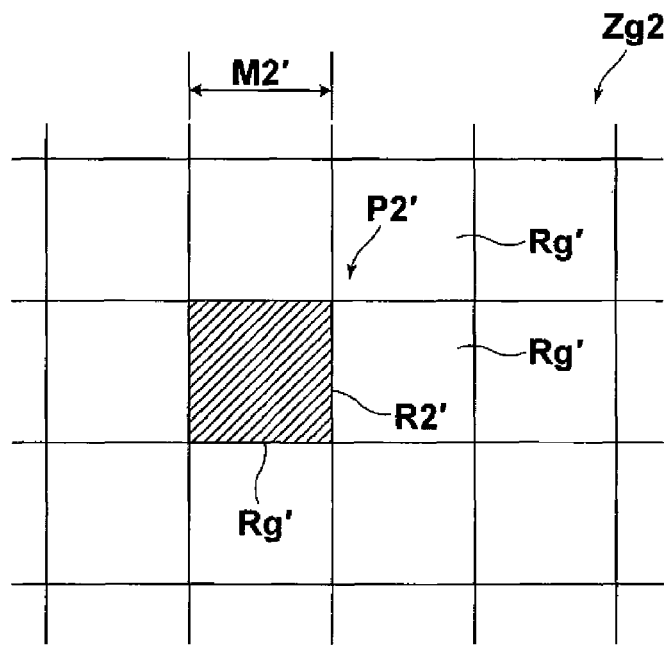
FIG. 3B is a view showing an image of a point image displayed in an image expressed by second image data.

FIG. 2A is a view showing the light intensity distribution of a point image on the coordinates in which a vertical axis indicates a light intensity E and a horizontal axis indicates an X-direction position on a light receiving surface. FIG. 2B is a view showing each pixel region (denoted by reference numeral Rg in the drawing) of a light receiving pixel, which forms a light receiving surface, and a point image projected onto the light receiving surface on the coordinates in which a vertical axis indicates a Y-direction position on the light receiving surface and a horizontal axis indicates an X-direction position on the light receiving surface. FIG. 3A is a view showing an image of a point image displayed in an image expressed by the first image data, and FIG. 3B is a view showing an image of a point image displayed in an image expressed by the second image data. In addition, the sizes of pixel regions (denoted by reference numeral Rg" in the drawing) of the images shown in FIGS. 3A and 3B are equal. In addition, each pixel region Rg of a light receiving pixel that forms the light receiving surface 21 and the pixel region Rg" of an image expressed by the first image data G1 or the second image data G2 are regions corresponding to each other.

Figure 4A:
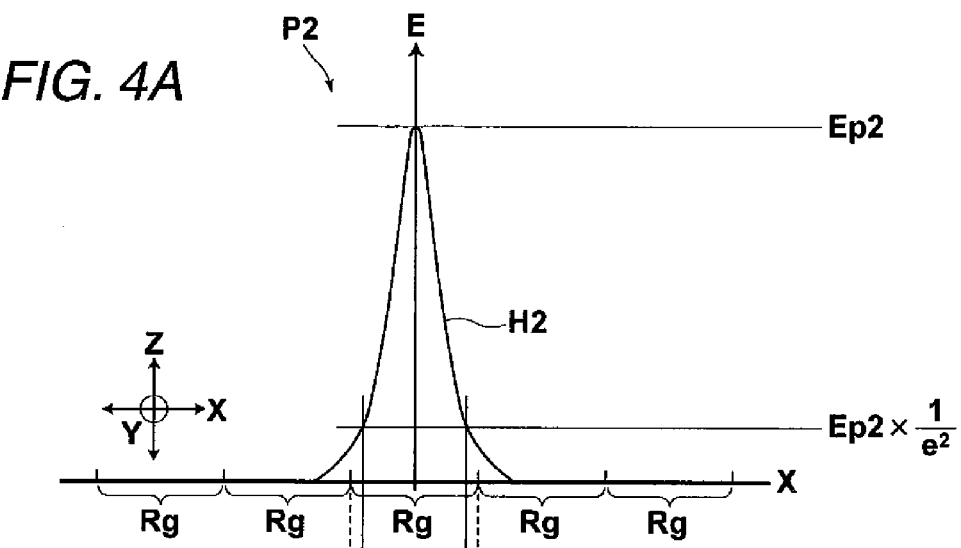
FIG. 4A is a view showing the light intensity distribution of a point image to be projected onto a light receiving surface when the resolving power of an imaging lens is higher.
Figure 4B:
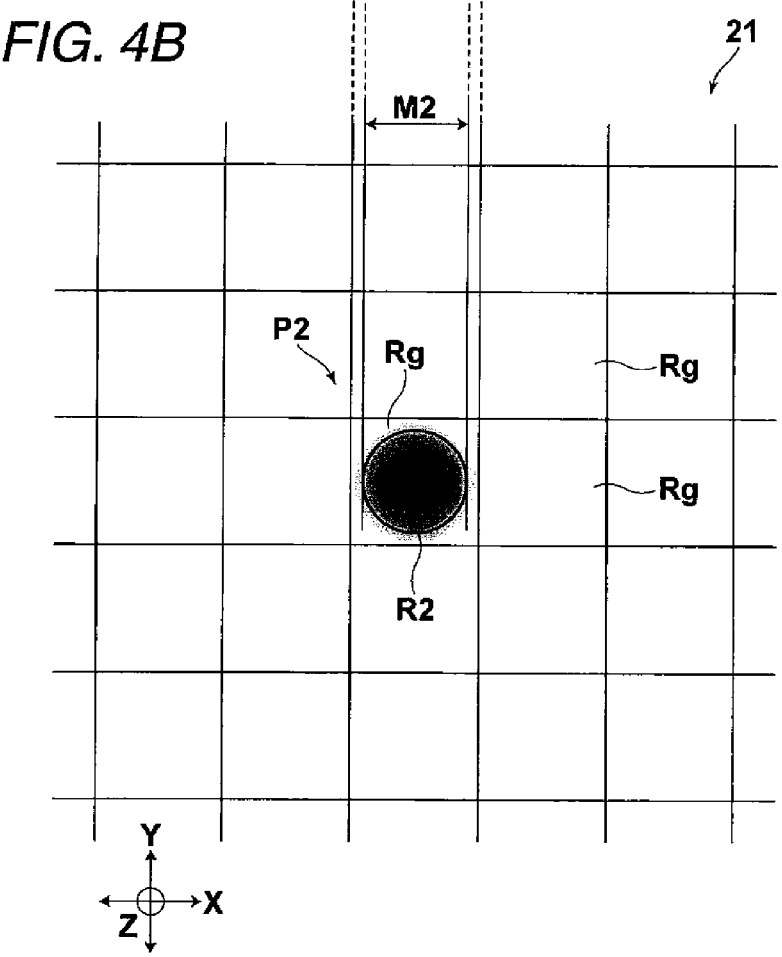
FIG. 4B is a view showing a point image to be projected onto the light receiving surface when the resolving power of the imaging lens is higher.

In addition, FIG. 4A is a view showing the light intensity distribution of a point image, which is to be projected onto the light receiving surface 21 when the resolving power of the imaging lens 10 is high, on the coordinates in which a vertical axis indicates the light intensity E and a horizontal axis indicates the X-direction position on the light receiving surface. In addition, this may be regarded as indicating an ideal point image state regardless of an optical system. FIG. 4B is a view showing each pixel region (denoted by reference numeral Rg in the drawing) of a light receiving pixel, which forms the light receiving surface, and a point image P2, which is to be projected onto the light receiving surface 21 when the resolving power of the imaging lens 10 is high, on the coordinates in which the vertical axis indicates the Y-direction position on the light receiving surface and the horizontal axis indicates the X-direction position on the light receiving surface.

A maximum diameter M1 of an effective region R1 of the point image P1 which is an optical image projected onto the light receiving surface 21 through the imaging lens 10 is a size covering three continuous pixels of light receiving pixels that form the light receiving surface 21, as shown in FIG. 2B. In addition, the effective region R1 is a region covering a total of nine pixels including three pixels in the vertical direction and three pixels in the horizontal direction on the light receiving surface 21. That is, the effective region R1 is a region occupying 9 pixels (3 pixels×3 pixels) of light receiving pixels that form the light receiving surface 21.

In addition, as shown in FIG. 2A, the effective region R1 of the point image P1 is a region having a light intensity of $1/e^2$ or more of a peak intensity Ep1 on a light intensity distribution H1 indicating the point image P1.

The point image P1 projected onto the light receiving surface 21 is imaged by the imaging device 20, and the first image data G1 expressing this point image P1 is output from the imaging device 20.

As shown in FIG. 3A, an image P1" corresponding to the point image P1 displayed in an image Zg1 indicated by the first image data G1 is displayed with an effective region R1" of the image P1" covering nine pixels (3 pixels×3 pixels) of the image with no change.

Then, the signal processing unit 40 to which the image data G1 has been input executes the restoration processing F on the first image data G1 using a restoration coefficient K1, obtaining the second image data G2.

As shown in FIGS. 3A and 3B, an effective region R2" of an image P2" of a point image in an image Zg2 indicated by the second image data G2 corresponding to the image P1" of the point image expressed by the first image data G1 is smaller than the effective region R1" of the image P1" of the point image in the image Zg1 indicated by the first image data G1. Accordingly, a maximum diameter M2" (region corresponding to three pixels of the pixel region Rg") of the image P2" of the point image displayed in the image Zg2 also becomes smaller than a maximum diameter M1" (region corresponding to one pixel of the pixel region Rg") of the image P1" of the point image displayed in the image Zg1.

That is, the image P2" of the point image expressed by the second image data G2 shown in FIG. 3B and an image of a point image expressed by the first image data output from the imaging device 20 which has imaged the point image P2 (refer to FIG. 4) to be projected onto the light receiving surface 21 when the resolving power of the imaging lens 10 is high become equal images.

More specifically, the image P2" (refer to FIG. 3B) of the point image expressed by the second image data G2 obtained by executing the restoration processing F on the first image data G1, which is output from the imaging device 20 that has imaged the point image P1 (refer to FIGS. 2A and 2B) which is projected onto the light receiving surface 21 through the imaging lens 10 and whose effective region R1 covers nine pixels, using the restoration coefficient K and an image of a point image expressed by the first image data G1 output from the imaging device 20 which has imaged the point image P2 (the maximum diameter M2 of the effective region R2 is included in one pixel region Rg; refer to FIGS. 4A and 4B), which is expected to be projected onto the light receiving surface 21 when the resolving power of the imaging lens 10 is high, are equal images.

In addition, the effective region R2 of the point image P2 included in one pixel region Rg on the light receiving surface 21 shown in FIGS. 4A and 4B is a region having a light intensity of $1/e^2$ or more of a peak intensity Ep2 on a light intensity distribution H2 indicating the point image P2, similar to the case of the point image P1. Here, the effective region R1 of the point image P2 has a size included in one pixel region Rg.

Thus, the resolution of an image expressed by the second image data obtained by performing restoration processing on the first image data may be higher than that of the image expressed by the first image data.

In addition, since the same image as an image obtained when the depth of field of the imaging lens 10 is made large can be obtained by the restoration processing F, it can be said that the restoration processing makes the depth of field of the imaging lens 10 substantially large.

For example, image restoration processing disclosed in paragraphs ([0002] to [0016]) of JP-A-2000-123168 may be adopted as the restoration processing F of the signal processing unit 40 using the restoration coefficient K corresponding to a state of the point image P1 expressed by the first image data G1.

Although a case of imaging a point image has been described, an optical image of a subject projected onto the light receiving surface 21 through the imaging lens 10 is regarded as a group of point images expressing the subject. Therefore, even if any subject is imaged, the second image data expressing an image can be generated with resolution higher than the image expressed by the first image data by performing restoration processing on the first image data.

<Regarding the Performance of an Imaging System>

Next, performance of an imaging system configured to include the imaging lens 10 and the imaging device 20, which are used in the above imaging system 100, will be described.

Figure 5:
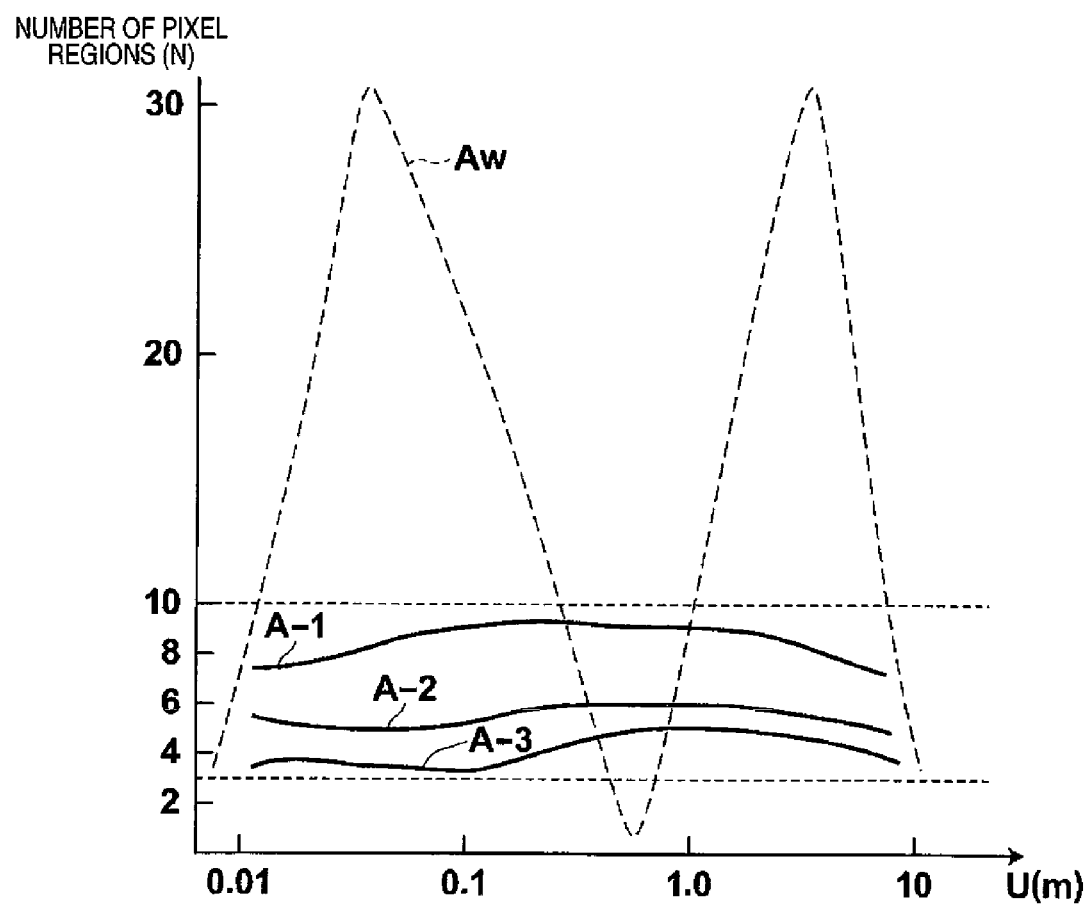
FIG. 5 is a view showing a change in a maximum diameter of an effective region of a point image, which is an optical image of an object point, projected onto a light receiving surface when the object point is made to move in an optical-axis direction.

FIG. 5 is a view schematically showing a change in a maximum diameter of an effective region of a point image, which corresponds to an object point and is projected onto a light receiving surface when the object point is made to move in an optical-axis direction, on the coordinates in which a horizontal axis indicates an optical-axis-direction distance U from an imaging lens to the object point on a logarithmic scale (m) and a vertical direction indicates a length corresponding to the number (N) of pixel regions located continuously on a light receiving surface.

Here, an object point is moved from a position of a near point approximately adjacent to an imaging lens (position adjacent to the imaging lens by about 0.01 m) to a position of a far point approximately infinitely distant from the imaging lens (position distant from the imaging lens by about 10 m).

Three kinds of curves (solid lines) indicated by groups A-1, A-2, and A-3 in FIG. 5 schematically show changes in maximum diameters of effective regions of point images projected onto different specific regions (specific regions on the light receiving surface having different image heights) on the light receiving surface 21 through the imaging lens 10 of the imaging system of the invention. In addition, a curve line (dotted line) indicated by a group Aw in FIG. 5 shows a typical change in a maximum diameter of an effective region of a point image projected onto the light receiving surface through an imaging lens used in a known imaging system (for example, an onboard camera, a portable cellular phone camera, or a camera for medical apparatus).

As can be seen from FIG. 5, the maximum diameter of an effective region of a point image obtained by projecting an object point onto the light receiving surface 21 largely changes from a size corresponding to one pixel to a size corresponding to thirty pixels according to the movement of the object point in the optical-axis direction.

On the other hand, the maximum diameter of the effective region of the point image obtained by projecting the object point onto the light receiving surface 21 through the imaging lens 10 provided in the imaging system 100 of the invention is a size covering three or more pixels and ten pixels or less in all cases of the groups A-1, A-2, and A-3. That is, there is little fluctuation in the size of the effective region of the point image on the light receiving surface regardless of the distance from the imaging lens 10 to the object point and the position (for example, an image height on the light receiving surface) of the projected point image on the light receiving surface. In addition, also in a point image projected from any position of X, Y, and Z directions, that is, any position in a three-dimensional space onto the light receiving surface through the imaging lens 10, it can be said that a fluctuation in the size of the effective region of the point image is small.

Figure 6:
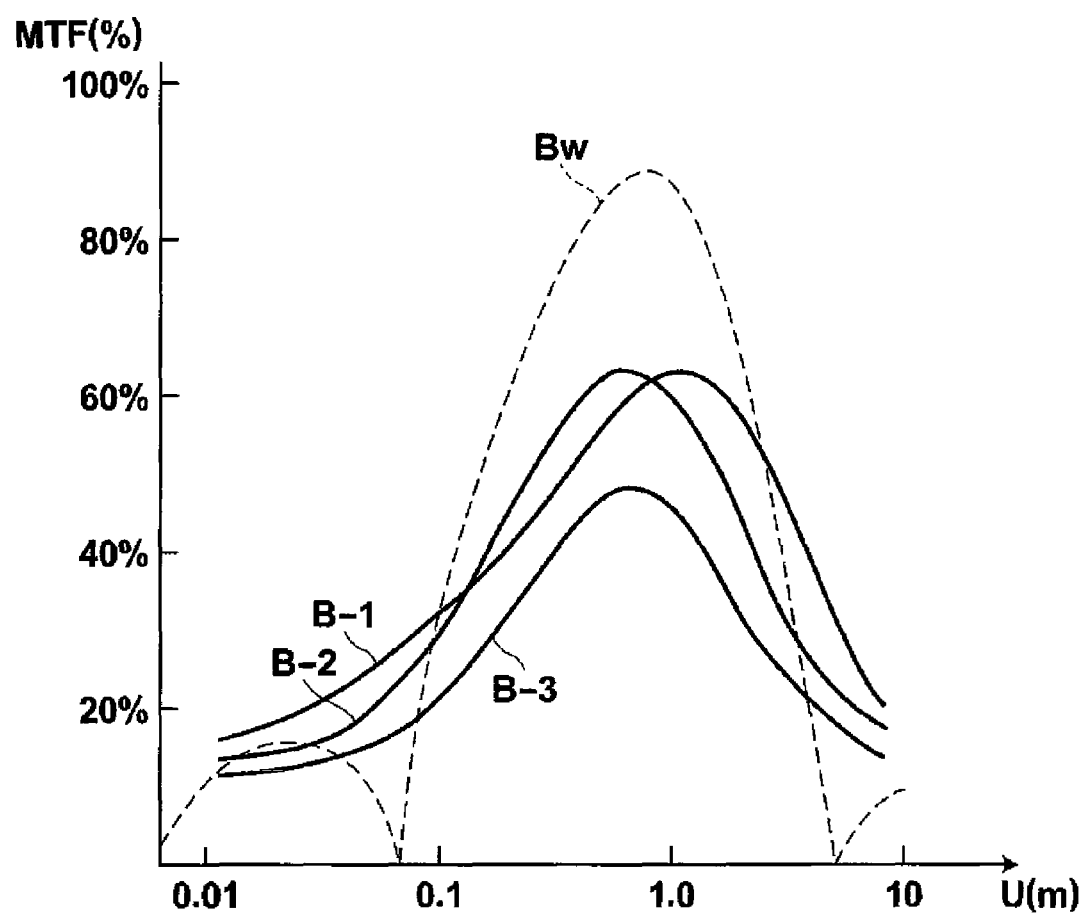
FIG. 6 is a view showing a change in a value (%) of MTF characteristics regarding an optical image of an object point projected onto a light receiving surface when the object point is made to move in an optical-axis direction.

FIG. 6 is a view schematically showing a change in a value (%) of MTF characteristics regarding an optical image of an object point projected onto a light receiving surface when the object point is made to move in an optical-axis direction, on the coordinates in which a horizontal axis indicates an optical-axis-direction distance U from an imaging lens to the object point on a logarithmic scale (m) and a vertical direction indicates the value (%) of MTF characteristics.

Here, an object point is moved from a position of a near point approximately adjacent to an imaging lens (position adjacent to the imaging lens by about 0.01 m) to a position of a far point approximately infinitely distant from the imaging lens (position distant from the imaging lens by about 10 m).

Three kinds of curves (solid lines) regarding the imaging system of the invention indicated by groups B-1, B-2, and B-3 in FIG. 6 schematically show a value (%) of MTF characteristics regarding optical images projected onto different specific regions (specific regions having different image heights) on the light receiving surface through the imaging lens 10. In addition, a curved line (dotted line) indicated by a group Bw in FIG. 6 shows a typical change in a value (%) of MTF characteristics regarding an optical image projected onto a light receiving surface in a known imaging system.

As can be seen from FIG. 6, in a known imaging system, a value (%) of MTF characteristics regarding an optical image projected onto the light receiving surface 21 largely changes from 0% to a value exceeding 80%. In addition, false resolution occurs at an object point located in a region (region at which a value of MTF characteristics is turned up from 0%), which is closer to the imaging lens 10 than a position at which a value of MTF characteristics becomes 0%, of a near point where the imaging lens 10 and the object point are adjacent to each other. In addition, the false resolution also occurs at an object point located in a region (region at which a value of MTF characteristics is turned up from 0%), which is more distant from the imaging lens 10 than a position at which a value of MTF characteristics becomes 0%, of a far point where the imaging lens 10 and the object point are distant from each other.

On the other hand, the value (%) of MTF characteristics regarding an optical image projected onto the light receiving surface 21 through the imaging lens 10 provided in the imaging system 100 of the invention is a size of 10% or more and 60% or less in any case of the groups B-1, B-2, and B-3, and the false resolution does not occur. That is, a fluctuation in a value of MTF characteristics regarding an optical image projected onto a light receiving surface is small and the false resolution does not occur regardless of the distance from the imaging lens 10 to an object point and the position (for example, the image height on the light receiving surface) on the light receiving surface of the projected optical image. In addition, it can also be said that a fluctuation in the value of the MTF characteristics regarding an optical image projected from any position of X, Y, and Z directions onto the light receiving surface through the imaging lens 10 is small.

In addition, the imaging lens 10 is constructed such that a value of MTF characteristics of an optical image of a subject, which is projected onto the light receiving surface 21 through the imaging lens 10 from any position of X, Y, and Z directions which is distant by ten times or more of a focal length (for example, 4 to 5 mm) of the imaging lens 10, is a positive value.

In addition, the imaging system 10 may be constructed such that the maximum diameter of an effective region of a point image, which is projected onto a light receiving surface from any position of X, Y, and Z directions of an object space within a range in which an imaging lens and an imaging device are restricted to, for example, 10 f or more in the Z direction and are restricted up to an intended object height in the X and Y directions, becomes a size covering three or more pixels of light receiving pixels which form the light receiving surface of the imaging device.

However, the imaging lens 10 is not necessarily limited to one that satisfies the above condition. An effect of improving the quality of image data output from the imaging device 20 can be obtained as long as the imaging lens 10 and the imaging device 20 are constructed such that the maximum diameter of an effective region of a point image, which is projected onto the light receiving surface 21 through the imaging lens 10 from any position of X, Y, and Z directions, becomes a size covering three or more pixels of light receiving pixels on the light receiving surface.

As described above, according to the imaging system of the first embodiment of the invention, lack of the resolution of an image expressed by the first image data output from the imaging system can be supplemented only by performing restoration processing (image processing) on the first image data unlike the related art. That is, since the second image data that expresses an image with desired resolution can be obtained by performing the restoration processing on the first image data, the quality of image data obtained by imaging an optical image projected onto a light receiving surface can be improved easily.

<Regarding Operations of a Restoration Coefficient Acquisition Apparatus>

Hereinafter, an operation of the restoration coefficient acquisition apparatus 70A will be described in detail. The following processes are needed as functions of the restoration coefficient acquisition apparatus 70A.

(1) Point image measurement and determination on uniformity within a screen (2) Extraction of a coefficient group (restoration coefficient) applying optimal restoration processing (3) Recording of an optimal coefficient group.

Each of the functions will be described in more detail.

The process (1) is a function of actually measuring and determining an imaging ability (resolving power) in the combination of each imaging lens and an imaging device. As a means for measuring an optical point image on the basis of an electric signal (first image data) obtained from an imaging device, a DxO analyzer made by DxO Co. in France is commercially available. This uses a concept of expressing blur called B×U that the DxO Co. proposes, which allows to obtain a point image (both an optical point image and a point image after image processing) from an output signal from an imaging device.

Specifically, the DxO analyzer calculates the point image size at an arbitrary point on a light receiving surface of an imaging device by analyzing image data (first image data) obtained by taking an intended designated chart (chart in which a number of black dots are arrayed on white paper) (http://www.dxo.com/jp/image_quality/dxo analyzer).

In addition, any means for measuring an optical point image may be used as long as the means can calculate a point image from an output signal from an imaging device (that is, a sensor).

On the other hand, the size of a point image corresponding to an optical design value can be calculated with a tool which designed the optical system. Accordingly, by comparing the size of a "design value point image" obtained in the calculation with the size of a "measured point image" measured in a measuring apparatus, such as the DxO analyzer, it can be determined how far the measured point image deviates from the design value. For example, in many cases, the size of the measured point image when there is an assembly error in an optical component becomes larger than the design value. In addition, the shape or brightness distribution of an effective region of a point image projected onto a light receiving surface of an imaging device is originally symmetrical with respect to a point. However, when the imaging lens is inclined or the axis deviates, front blur and back blur, a so-called "single-sided blur state" partially occurs. Such deviation from a design value is calculated by comparing the "design value point image" with the "measured point image", such that a determination on whether or not it can be said to be the same as the design value may be further made. In addition, even if attention is not paid to the design value point image, it is also possible to define an ideal state arbitrarily, compare the ideal state ("ideal point image") with a "measured point image", and determine the difference.

The process (2) is a step of executing restoration processing based on a Kernel Wiener filter and obtaining a coefficient group (restoration coefficient) for bringing the "measured point image" close to the "design value point image" or the "ideal point image" by calculation. The Kernel Wiener filter is widely used in a technique of estimating an original signal from an observed signal included in a noise when the original signal is observed together with the noise through a filtering, as disclosed in the document "title "Kernel Wiener Filter", Yoshikazu Washizawa and Yukihiko Yamashita, 2003 Workshop on Information-Based Induction Sciences, (IBIS2003), Kyoto, Japan, Nov. 11-12, 2003". Here, assuming that the original signal is a "taken object", the filtering is "imaging lens+imaging device", the observed signal is an "image signal (first image data)", and the noise is a "difference between a design value point image (or an ideal point image) and a measured point image", the "taken object" can be estimated by application of the Kernel Wiener filter.

If there is no error factor in the "imaging lens+imaging device" of an actual object, a taken object becomes an image signal and an ideal "image signal (second image data)" is theoretically acquired after the restoration processing. Practically, there is a measurement error in the process (1) and a noise component partially remains without being completely removed. However, it is clear that a measured point image becomes similar to a design value point image or an ideal point image, and the quality of a final image is improved.

Specifically, even if an optical point image is larger than a design value or is not uniform on an imaging surface due to a certain error factor, performance allowable in practical use can be secured by making the point image uniform on the imaging surface or correcting the point image small by restoration processing. In addition, also in an optical system in which low performance (optical point image is larger than an element pitch) is not avoidable in terms of design as well as an error factor in manufacture, the optical performance can be seemingly improved by correcting the point image. By pursuing an improvement in optical performance in appearance, it becomes possible to exceed the critical resolution theoretically indicated. This is very useful if the tendency of miniaturization of a pixel size in recent years is considered.

Here, the critical resolution is set as a size of the Airy disk, and a radius Re of an effective region (peak intensity×$(1/e^2)$) of a point image intensity of an aplanatic lens and a radius Re making the intensity zero are defined by the following expressions. Pixel pitches of latest CMOS devices used as imaging devices are 2.2 microns and 1.75 microns, and it is expected that 1.4 microns and 1.0 microns will be the mainstream from now on. As an example, Re and Re are calculated as follows in the case of F2.8 and a wavelength of 550 nm.

Re(radius of an effective region of a point image intensity)=0.82 $\lambda F$=0.82×2.8×550×0.001=1.26 microns(diameter of the effective region of the point image intensity=2.52 microns)

Re(radius making the point image intensity zero)= 1.22 $\lambda F$=1.22×2.8×550×0.001=1.88 microns (diameter making the point image intensity zero=3.76 microns).

In this case, the pixel pitch already exceeds the diffraction limitation. Although non-aberration is assumed in the diffraction limitation, the non-aberration is not realized in an actual optical system. Particularly when requests of miniaturization and reduction in cost are considered, the aberration remains rather and accordingly, the compromised performance cannot be avoided. The restoration processing using the Kernel Wiener filter can improve the quality of a final image up to a practical degree in such a situation.

Although it is assumed that the restoration processing is executed on a specific image surface or at the extreme vicinity (range of front blur and back blur), it is also possible to extend the focal depth if restoration processing for eliminating a difference between a measured point image and a design value point image in a number of image surface groups in the defocus direction corresponding to a fluctuation in taking distance is considered.

Regarding execution of the restoration processing, it is desirable to perform optimal restoration processing for every combination of "imaging lens+imaging device" since a noise component to be removed varies according to each "imaging lens+imaging device". In this case, preferably, the algorithm of restoration processing itself is equal and a "coefficient group" referred herein is optimal.

The process (3) is a step of actually combining the "optimal coefficient group" with a set of the "imaging lens+imaging device". In order to do so, it is necessary to store a coefficient group for executing the optimal restoration processing in an intended recording medium and to add the coefficient group to the set of "imaging lens+imaging device". Accordingly, a recording process is required.

Thus, an optical point image is corrected in a form suitable for the application by using an imaging system as a set of "imaging lens+imaging device+recording medium", and an image with satisfactory quality can be obtained eventually. Specifically, even if the resolving power is not satisfactory for a certain reason (manufacturing tolerance and original design value are low), a means capable of obtaining satisfactory resolving power as an image after processing is provided. In addition, a focal depth magnifying means suitable for the characteristics of each set of imaging lens and imaging device may also be provided.

<Modification of a Restoration Coefficient Acquisition Apparatus>

Hereinafter, a modification of the restoration coefficient acquisition apparatus will be described.

The restoration coefficient acquisition apparatus which makes the restoration coefficient K1, which corresponds to a blur state of a point image expressed by the first image data output from the imaging device, stored in the coefficient storage unit 30 may be constructed like a restoration coefficient acquisition apparatus 70B of a second example or a restoration coefficient acquisition apparatus 70C of a third example, which will be described below and is different from the restoration coefficient acquisition apparatus 70A in the first example.

Figure 7:
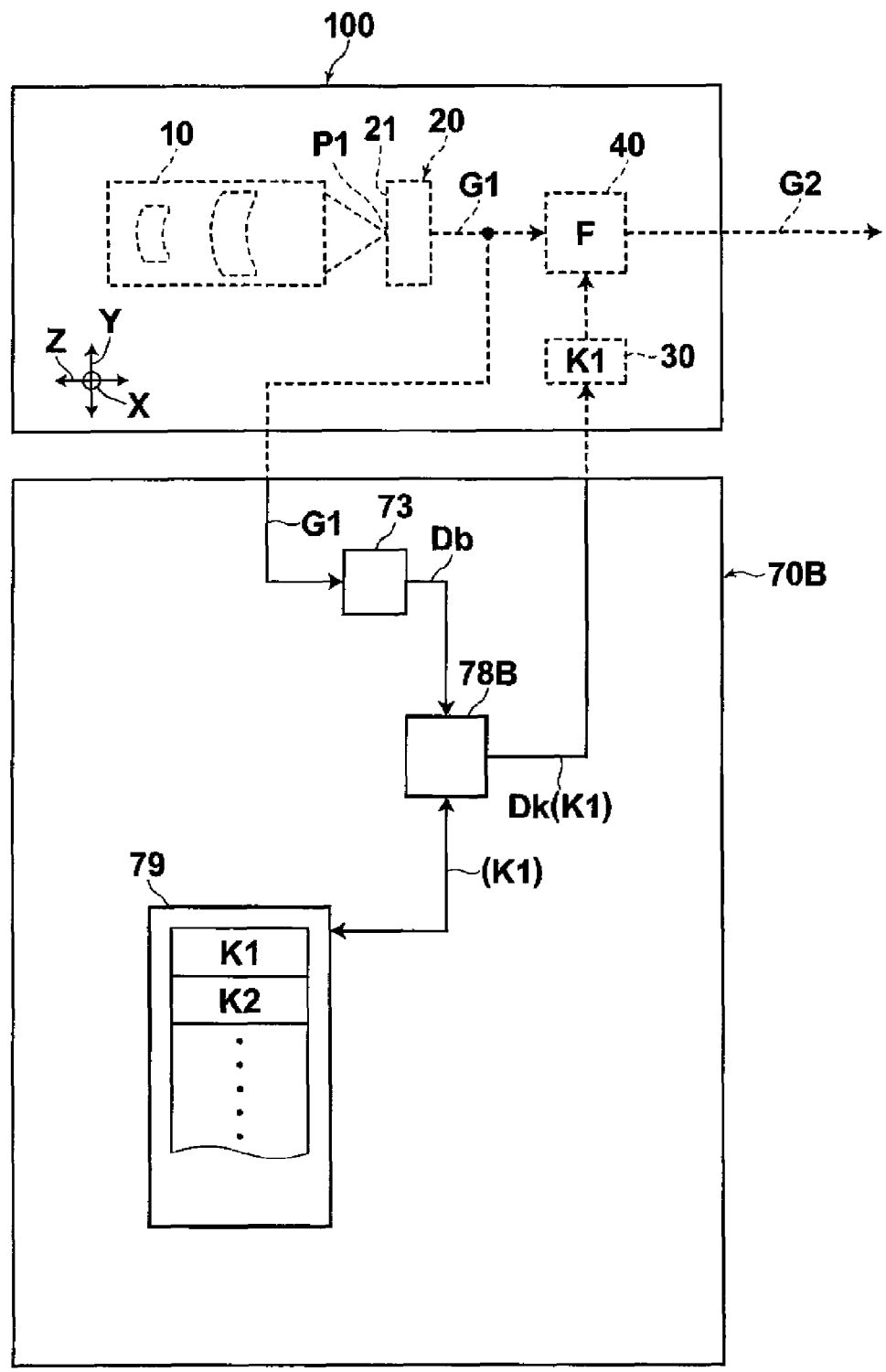
FIG. 7 is view showing a restoration coefficient acquisition apparatus in a second example.

FIG. 7 is a view showing the restoration coefficient acquisition apparatus 70B of the second example that stores a restoration coefficient, which is selected corresponding to a blur state of a point image expressed by the first image data among candidates of each restoration coefficient corresponding to each of blur states of point images classified into a plurality of types.

As shown in FIG. 7, the restoration coefficient acquisition apparatus 70B includes: a candidate coefficient storage unit 79 that stores candidates K1, K2, . . . of each restoration coefficient corresponding to each of blur states of point images classified into a plurality of types beforehand; a point image blur state acquisition unit 73 that acquires a blur state of the point image P1 projected onto the light receiving surface 21 through the imaging lens 10; and a restoration coefficient acquisition unit 78B that selects a restoration coefficient (for example, K1), which corresponds to a blur state of the point image P1 expressed by the first image data G1, among the restoration coefficient candidates K1, K2, . . . and makes the restoration coefficient K1 stored in the coefficient storage unit 30.

In the restoration coefficient acquisition apparatus 70B, the point image blur state acquisition unit 73 acquires the blurred point image state data Db indicating a blur state of the point image, and the restoration coefficient acquisition unit 78B selects a restoration coefficient (for example, K1), which corresponds to a blur state of the point image P1 expressed by the blurred point image state data Db, among the restoration coefficient candidates K1, K2, . . . stored in the candidate coefficient storage unit 79 and makes coefficient data Dk indicating the restoration coefficient K1 output and stored in the coefficient storage unit 30.

That is, a restoration coefficient selected corresponding to a blur state of a point image expressed by the first image data G1 among the candidates K1, K2, . . . of each restoration coefficient corresponding to each of blur states of point images classified into a plurality of types is stored in the coefficient storage unit 30.

Figure 8:
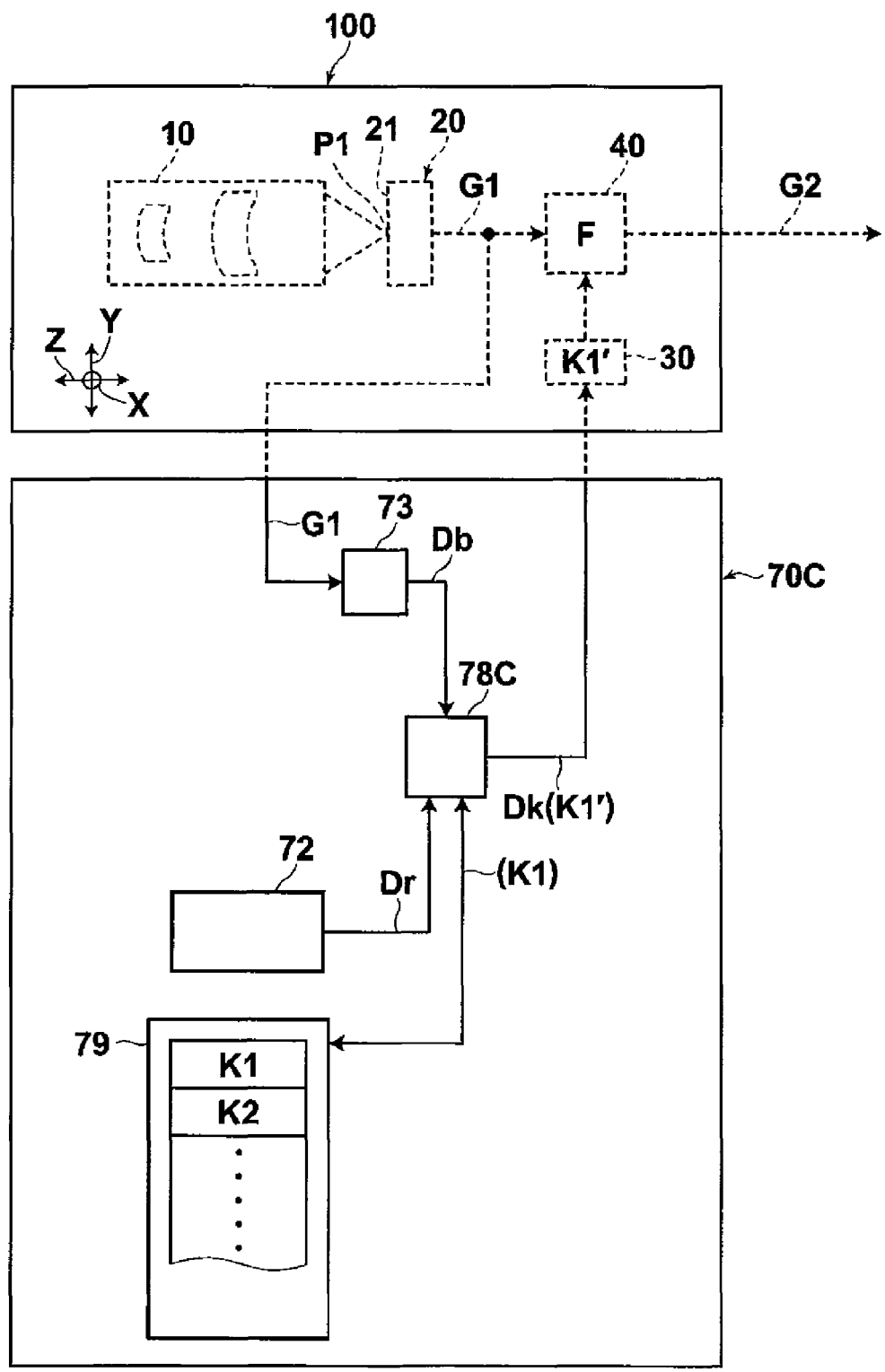
FIG. 8 is view showing a restoration coefficient acquisition apparatus in a third example.

FIG. 8 shows the restoration coefficient acquisition apparatus 70C of the third example that makes a correction-completed restoration coefficient obtained by correcting a restoration coefficient, which is selected corresponding to a blur state of the point image expressed by the first image data among candidates of a plurality of types of restoration coefficients corresponding to each of blur states of point images classified into a plurality of types, stored in the coefficient storage unit.

As shown in FIG. 8, the restoration coefficient acquisition apparatus 70C includes: a candidate coefficient storage unit 79 that stores candidates K1, K2, . . . of each restoration coefficient corresponding to each of blur states of point images classified into a plurality of types beforehand; an ideal point image storage unit 72 that stores data Dr, which is either ideal point image state data or design data regarding the ideal point image P1 projected onto the light receiving surface 21 through an imaging lens with high resolving power, beforehand when the resolving power of the imaging lens 10 is high; a point image blur state acquisition unit 73 that acquires a blur state of the point image P1 projected onto the light receiving surface 21 through the imaging lens 10; and a restoration coefficient acquisition unit 78C that selects a restoration coefficient (for example, K1) corresponding to a blur state of the point image P1 among the restoration coefficient candidates K1, K2, . . . , acquires coefficient data Dk (K1') indicating a correction-completed restoration coefficient K1' obtained by correcting the restoration coefficient K1 by an operation using the blur state of the point image P1 and the data Dr which is ideal point image state data or design data of a point image stored beforehand in the ideal point image storage unit 72, and makes the correction-completed restoration coefficient K1" indicated by the coefficient data Dk (K1") stored in the coefficient storage unit 30.

In the restoration coefficient acquisition apparatus 70C, the point image blur state acquisition unit 73 acquires blur state data indicating the blur state of the point image P1 projected onto the light receiving surface 21 through the imaging lens 10. The restoration coefficient acquisition unit 78B selects a restoration coefficient (for example, K1), which corresponds to the blur state of the point image P1, among the restoration coefficient candidates K1, K2, . . . stored in the candidate coefficient storage unit 79. In addition, the correction-completed restoration coefficient K1', which is obtained by correcting the restoration coefficient K1 by the operation using the blur state of the point image P1 and the data Dr which is ideal point image state data or design data of the point image stored beforehand in the ideal point image storage unit 72, is acquired and the correction-completed restoration coefficient K1 is stored in the coefficient storage unit 30.

That is, the correction-completed restoration coefficient K1' obtained by correcting a restoration coefficient (for example, K1), which is selected corresponding to a blur state of the point image P1 expressed by the first image data G1 among a plurality of kinds of restoration coefficient candidates corresponding to each of blur states of point images classified into a plurality of types, according to the blur state is stored in the coefficient storage unit 30.

Figure 9:
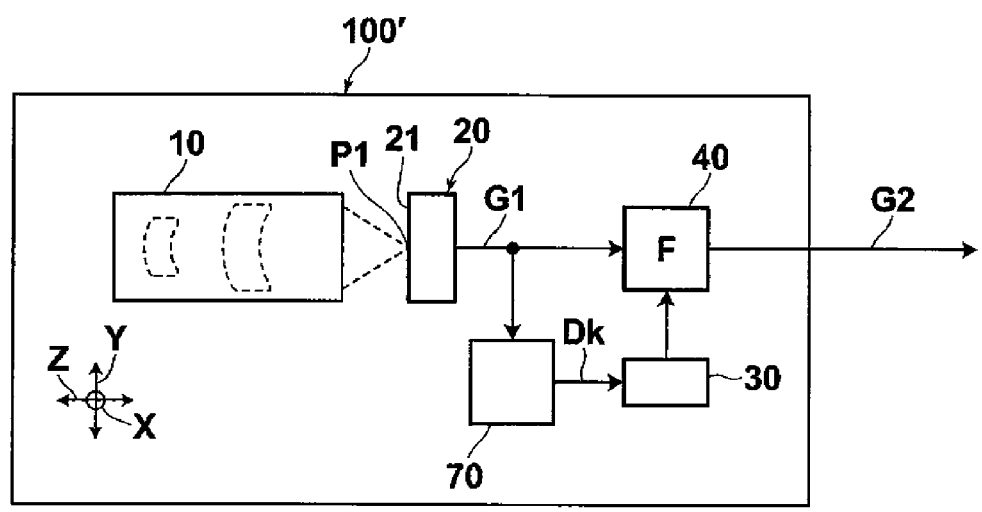
FIG. 9 is a view showing an imaging system including a restoration coefficient acquisition apparatus.

Moreover, as shown in FIG. 9, the imaging system of the invention may also be an imaging system 100' in which a restoration coefficient acquisition apparatus 70, which has the same function as the restoration coefficient acquisition apparatus 70A, 70B, or 70C, or the coefficient storage unit 30 is provided in a housing of the imaging system.

Figure 10:
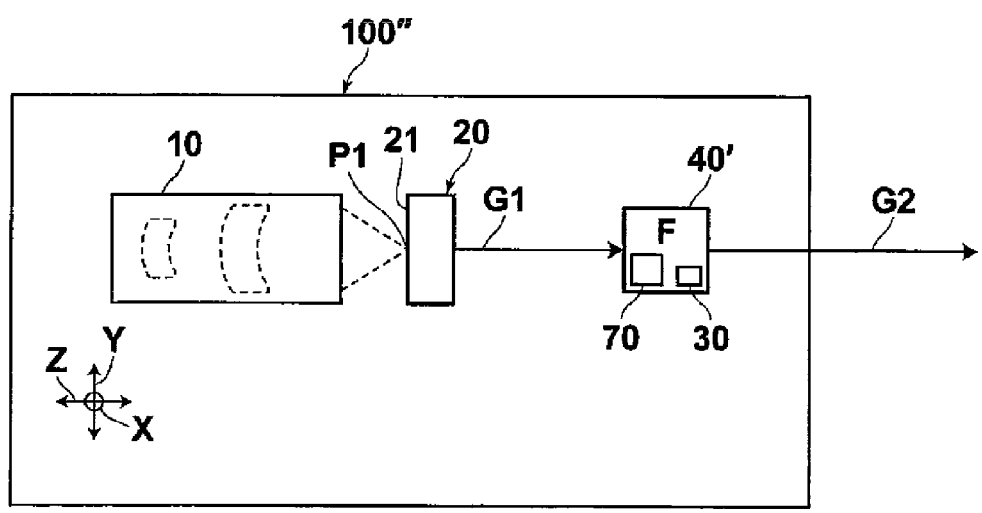
FIG. 10 is a view showing an imaging system including a restoration coefficient acquisition apparatus in a signal processing unit.

Furthermore as shown in FIG. 10, the imaging system of the invention may also be an imaging system 100" in which a signal processing unit 40' including the restoration coefficient acquisition apparatus 70 or the coefficient storage unit 30 is provided. That is, the signal processing unit 40' may be made to also function as the restoration coefficient acquisition apparatus 70.

<Modification of Each Constituent Element>

Hereinafter, modifications of constituent elements in the imaging system of the first embodiment will be described.

The signal processing unit may execute the restoration processing in a condition where a pixel region covering total nine or less pixels including three or less pixels in a vertical direction and three or less pixels in a horizontal direction is set as a minimum unit without being limited to a case where the restoration processing is executed in a condition where a pixel region covering total nine or more pixels including three or more pixels in the vertical direction and three or more pixels in the horizontal direction on the light receiving surface is set as a minimum unit.

In addition, the signal processing unit may also be made to calculate a restoration coefficient in other methods without being limited to a case where the restoration coefficient is calculated by an operation using the first image data expressing the blur state of the point image.

In addition, the signal processing unit may execute the restoration processing with a pixel region, which includes the whole effective region but is not the minimum, as a minimum unit without being limited to a case where the restoration processing is executed in a state where a minimum pixel region including the entire effective region of a point image projected onto a light receiving surface is set as a minimum unit.

Furthermore, the signal processing unit may execute the restoration processing such that the size of an effective region of a point image in an image expressed by first image data is equal to or larger than the size of an effective region of a point image in an image expressed by second image data without being limited to a case where the restoration processing is executed such that the size of the effective region of the point image in the image expressed by the second image data is smaller than the size of the effective region of the point image in the image expressed by the first image data.

Second Embodiment

Figure 11:
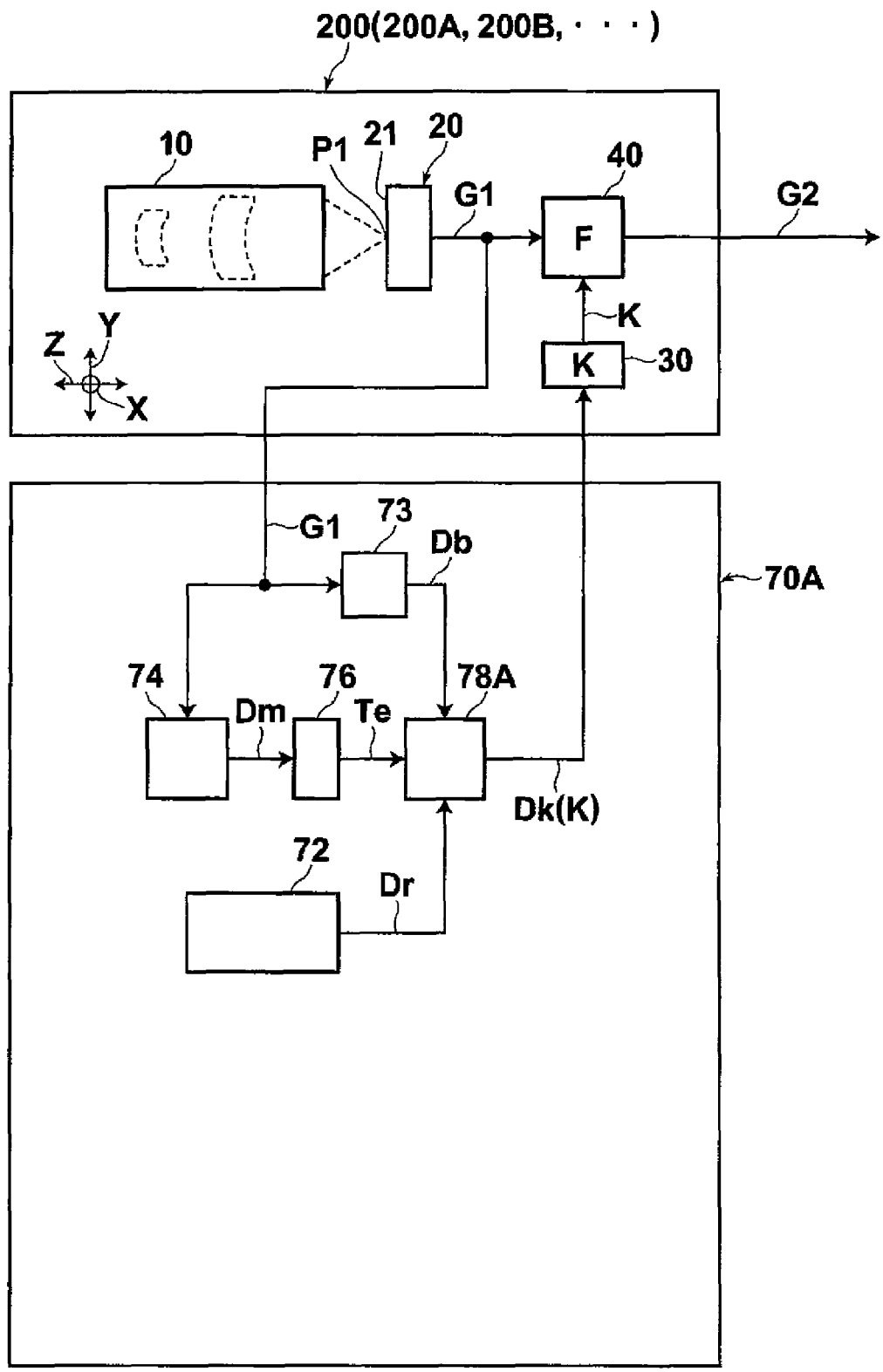
FIG. 11 is a block diagram showing a schematic configuration of an imaging system of the invention and a method of manufacturing an imaging system according to an exemplary embodiment of the invention.

FIG. 11 is a block diagram illustrating the schematic configuration of an imaging system according to a second embodiment of the invention.

<Configuration of an Imaging System>

Hereinafter, the configuration of an imaging system according to the second embodiment will be described.

An imaging system 200 of the invention shown in FIG. 11 includes: an imaging lens 10; an imaging device 20 which has a light receiving surface 21 on which a plurality of light receiving pixels are arrayed in a two-dimensional manner and which images an optical image P1 of a subject projected onto the light receiving surface 21 through the imaging lens 10 and outputs first image data G1 expressing the subject; a coefficient storage unit 30 that stores a restoration coefficient K corresponding to a blur state of the point image P1, which is expressed by the first image data G1 output from the imaging device 20, when the maximum diameter of an effective region of the point image projected onto the light receiving surface 21 through the imaging lens 10 is a size covering three or more pixels; and a signal processing unit 40 that executes restoration processing F on the first image data G1 using the restoration coefficient K stored in the coefficient storage unit 30, the restoration processing F being executed to generate second image data G2 equivalent to the first image data G1 output from the imaging device 20 when the resolving power of the imaging lens 10 is high.

The signal processing unit 40 executes the restoration processing F in a condition where a pixel region covering total nine or more pixels including three or more pixels in a vertical direction and three or more pixels in a horizontal direction on the light receiving surface 21 is set as a minimum unit.

The configuration of the imaging lens 10 is the same as that in the first embodiment.

Here, the maximum diameter of the effective region of the point image P1 projected onto the light receiving surface 21 is a diameter of the effective region in a direction in which the effective region of the point image P1 projected onto the light receiving surface 21 includes a largest number of light receiving pixels.

In addition, a direction indicated by arrow Z in FIG. 11 is a direction of an optical axis of the imaging lens 10, and directions indicated by arrows X and Y are directions parallel to the light receiving surface 21.

Here, a restoration coefficient acquisition apparatus 70A provided outside the imaging system 100 acquires the restoration coefficient K corresponding to a blur state of the point image P1 indicated by the first image data G1 output from the imaging device 20 and makes the restoration coefficient K in the coefficient storage unit 30.

The restoration coefficient acquisition apparatus 70A includes: an ideal point image storage unit 72 that stores data Dr, which is either design data regarding a point image when there is no error in an optical system including the imaging lens 10 or ideal point image state data regarding an ideal point image state exceeding it beforehand; a point image blur state acquisition unit 73 that analyzes a blur state of a point image expressed by the first image data G1 output from the imaging device 20 and acquires point image state data Db indicating the analysis result; a point image diameter acquisition unit 74 that acquires the maximum diameter of an effective region of the point image P1 projected on the light receiving surface 21 through the imaging lens 10; a determination unit 76 that determines whether or not the maximum diameter obtained in the point image diameter acquisition unit 74 is a size covering three or more pixels on the light receiving surface 21; and a restoration coefficient acquisition unit 78A that is input with the point image state data Db output from the point image blur state acquisition unit 73 and the data Dr which is design data or ideal point image state data stored in the ideal point image storage unit 72, acquires coefficient data Dk indicating the restoration coefficient K corresponding to the blur state of the point image P1 expressed by the first image data G1 by an operation using both the point image state data Db and the data Dr, and makes the restoration coefficient K indicated by the coefficient data Dk stored in the coefficient storage unit 30 when the determination unit 76 determines that the maximum diameter is a size covering three or more pixels on the light receiving surface 21.

<Regarding an Operation of an Imaging System>

Next, an operation of the above imaging system will be described.

First, an example of a case where a restoration coefficient is calculated by a restoration coefficient acquisition apparatus and the restoration coefficient is stored in a coefficient storage unit will be described.

An optical image of a subject projected onto the light receiving surface 21 through the imaging lens 10 is imaged by the imaging device 20, and the first image data G1 indicating the subject output from the imaging device 20 is input to the point image blur state acquisition unit 73 and the point image diameter acquisition unit 74.

The point image blur state acquisition unit 73 to which the first image data G1 has been input analyzes a blur state of a point image expressed by the first image data G1 and outputs the blurred point image state data Db indicating the analysis result.

In addition, the point image diameter acquisition unit 74 to which the first image data G1 has been input calculates the maximum diameter of the effective region of the point image P1 projected onto the light receiving surface 21 and outputs diameter data Dm indicating the maximum diameter. The determination unit 76 to which the diameter data Dm indicating the maximum diameter has been input determines whether or not the maximum diameter of the effective region of the point image P1 is a size covering three or more pixels on the light receiving surface 21 and outputs a signal Te when it is determined that the maximum diameter is a size covering three or more pixels.

The restoration coefficient acquisition unit 78A to which the signal Te has been input is input with the blurred point image state data Db output from the point image blur state acquisition unit 73 and the data Dr which is design data or ideal point image state data stored beforehand in the ideal point image storage unit 72, acquires the restoration coefficient K corresponding to the blur state of the point image P1 by an operation using both the blurred point image state data Db and the data Dr, and outputs the coefficient data Dk indicating the restoration coefficient K.

The coefficient data Dk output from the restoration coefficient acquisition unit 78A is input to the coefficient storage unit 30, such that the restoration coefficient K indicated by the coefficient data Dk is stored in the coefficient storage unit 30.

In addition, a DxO analyzer made by DxO Labs (France), which will be described later, may be mentioned as an example of realizing functions of the point image blur state acquisition unit 73 and point image diameter acquisition unit 74. In the DxO analyzer, a blur state (degradation state of the resolution) of the point image P1 projected onto the light receiving surface 21 or the maximum diameter of the effective region may be acquired by analyzing the first image data G1 output from the imaging device 20.

The restoration coefficient K is stored in the coefficient storage unit 30 as described above, resulting in a state where the imaging system 100 can execute restoration processing.

<Regarding a Restoration Function>

The same method as in the first embodiment can be adopted as a method in which second image data that expresses an image with higher resolution than an image expressed by first image data is acquired by executing the restoration processing F on the first image data output from the imaging device 20 using the restoration coefficient K stored in the coefficient storage unit 30.

<Modification of a Restoration Coefficient Acquisition Apparatus>

Hereinafter, a modification of the restoration coefficient acquisition apparatus will be described.

The restoration coefficient acquisition apparatus which makes the restoration coefficient K1, which corresponds to a blur state of a point image expressed by the first image data output from the imaging device, stored in the coefficient storage unit 30 may be constructed like a restoration coefficient acquisition apparatus 70B of a second example or a restoration coefficient acquisition apparatus 70C of a third example, which will be described below and is different from the restoration coefficient acquisition apparatus 70A in the first example.

Figure 12:
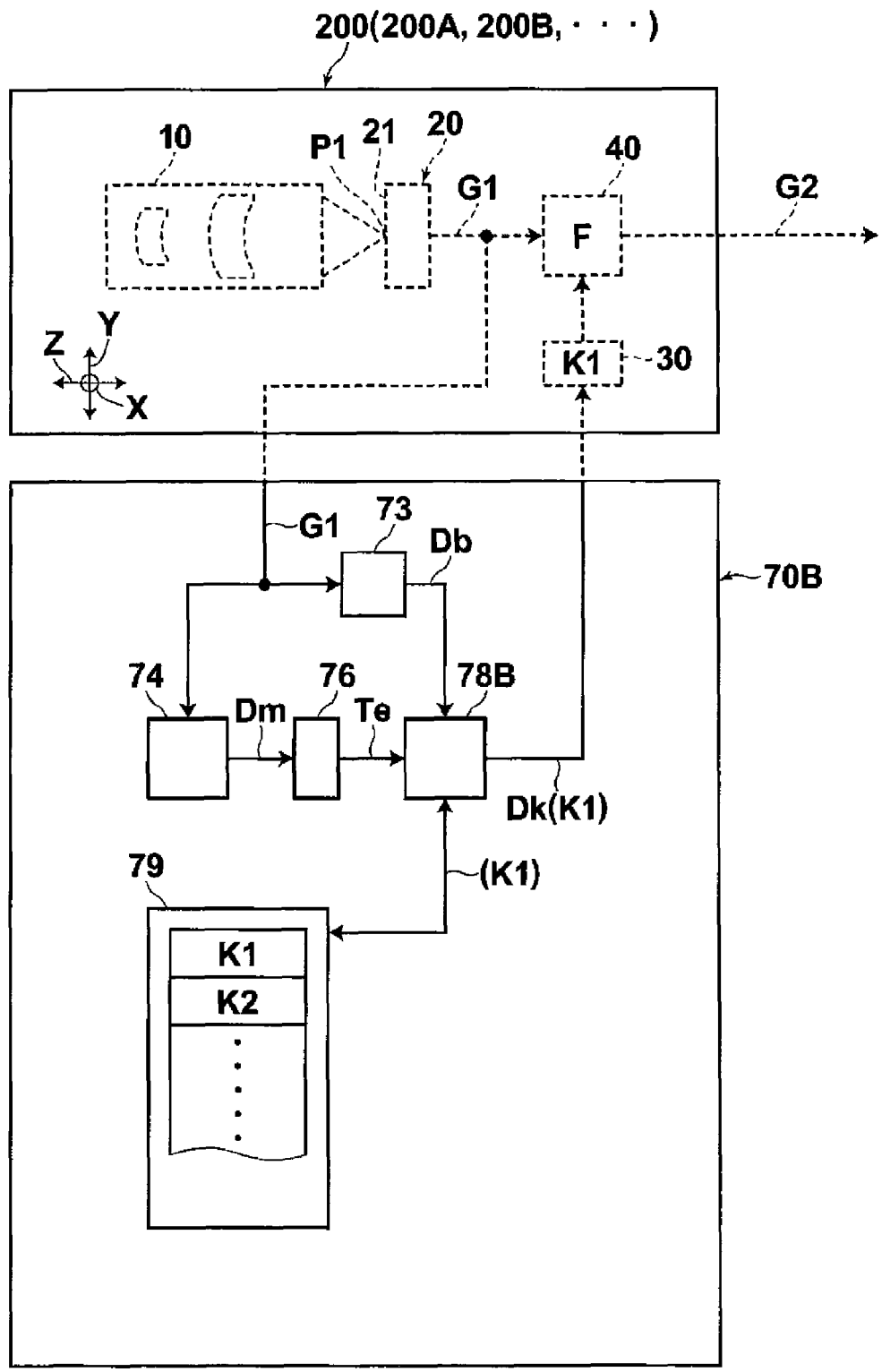
FIG. 12 is view showing a restoration coefficient acquisition apparatus in a second example.
Figure 13:
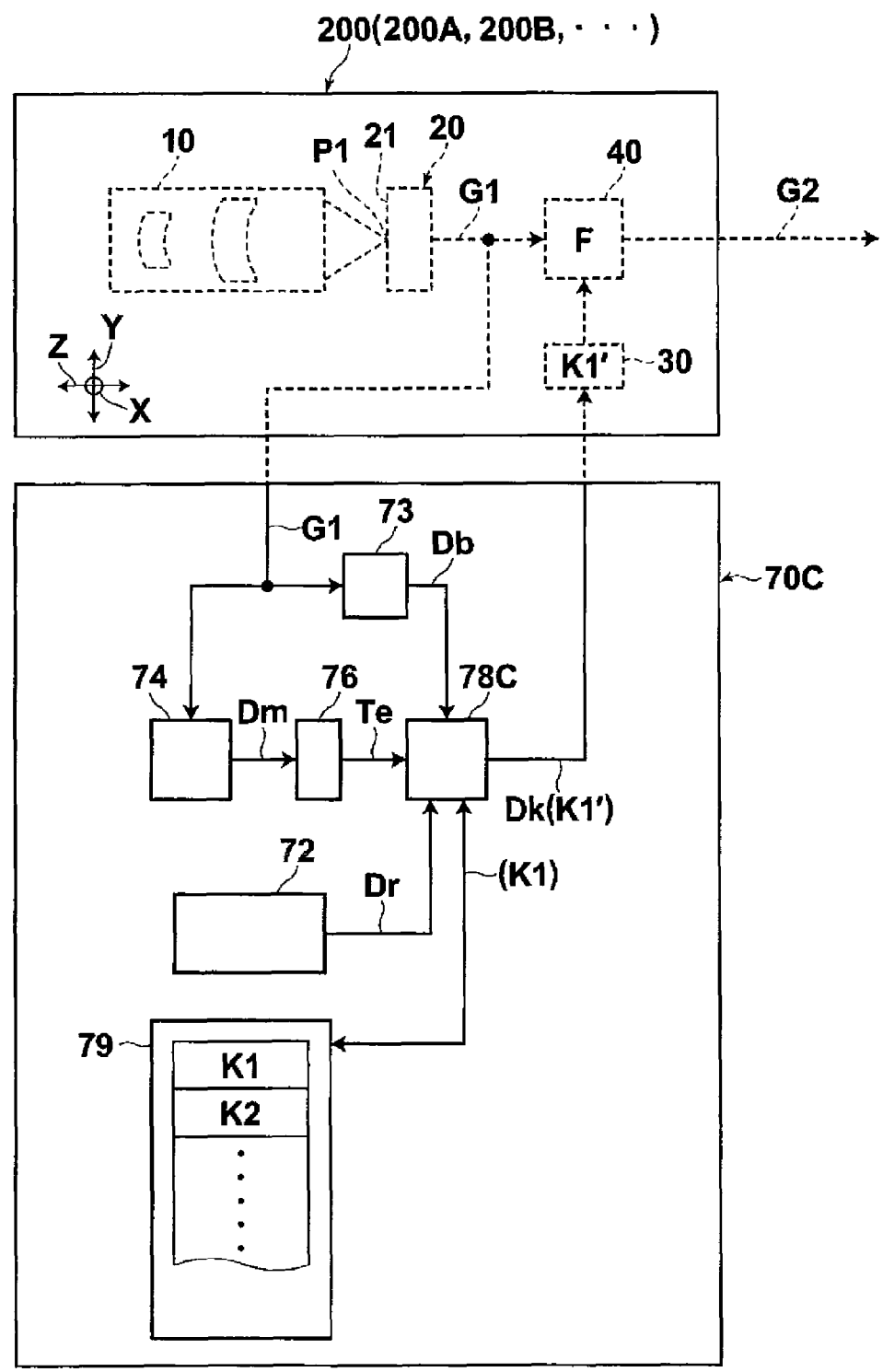
FIG. 13 is view showing a restoration coefficient acquisition apparatus in a third example.
Figure 14:
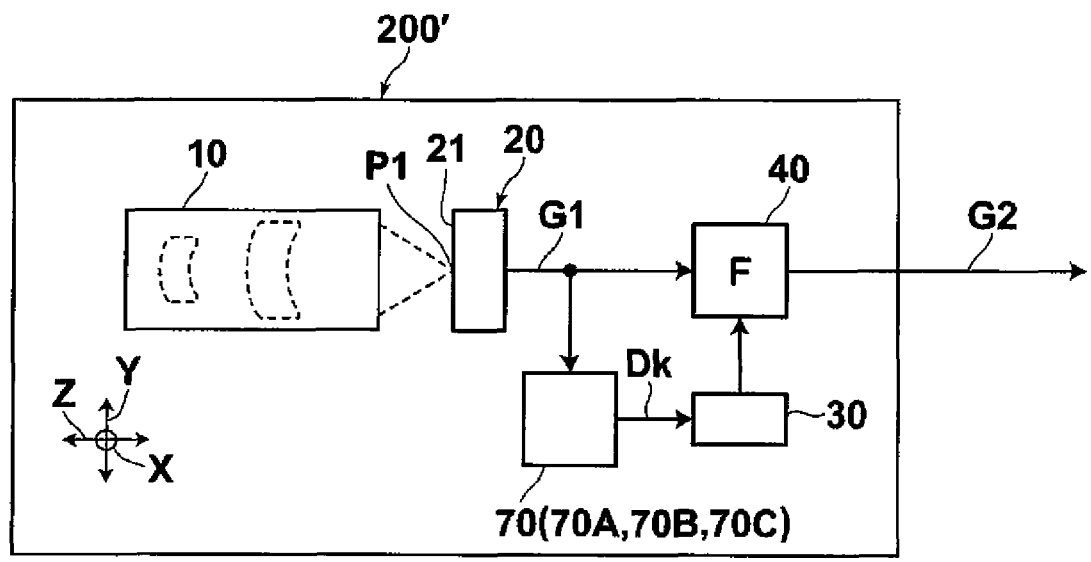
FIG. 14 is a view showing an imaging system including a restoration coefficient acquisition apparatus.
Figure 15:
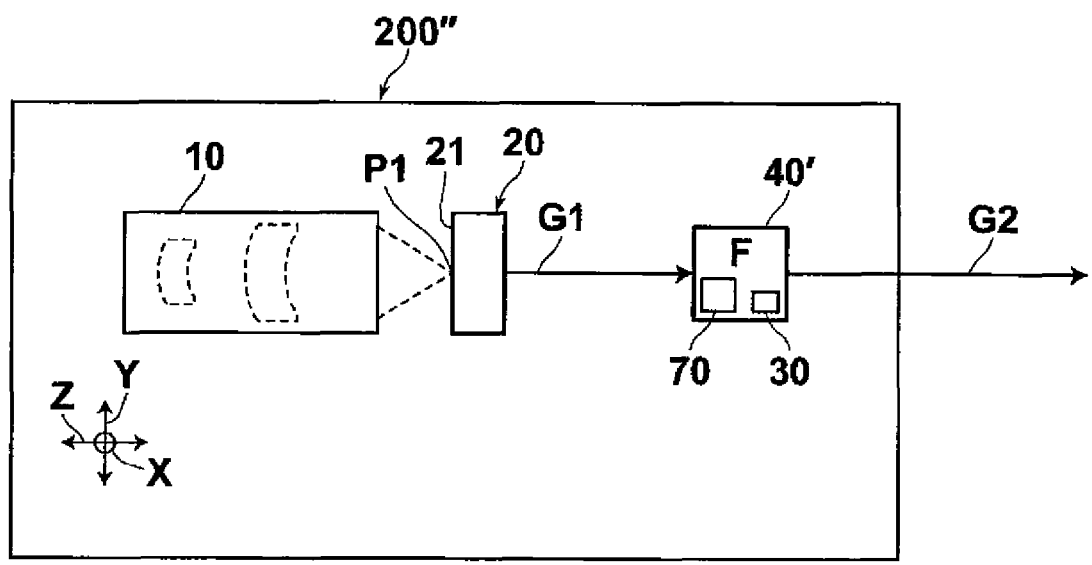
FIG. 15 is a view showing an imaging system including a signal processing unit that has a restoration coefficient acquisition apparatus and a coefficient storage unit.

FIG. 12 is a view showing the restoration coefficient acquisition apparatus 70B of the second example, and FIG. 13 is a view showing the restoration coefficient acquisition apparatus 70C of the third example. FIG. 14 is a view showing an imaging system including a restoration coefficient acquisition apparatus, and FIG. 15 is a view showing an imaging system including a signal processing unit that has a restoration coefficient acquisition apparatus and a coefficient storage unit. Moreover, in FIGS. 12 to 15, constituent components having the same functions as the restoration coefficient acquisition apparatus 70A of the first example are denoted by the same reference numerals as in the case of the restoration coefficient acquisition apparatus 70A of the first example.

As shown in FIG. 12, the restoration coefficient acquisition apparatus 70B of the second example includes: a candidate coefficient storage unit 79 that stores candidates K1, K2, . . . of each restoration coefficient corresponding to each of blur states of point images classified into a plurality of types beforehand; a point image blur state acquisition unit 73 that analyzes a blur state of a point image expressed by the first image data G1 output from the imaging device 20, acquires blurred point image state data Db indicating the analysis result, and outputs the blurred point image state data Db to a restoration coefficient acquisition unit 78B to be described later; a point image diameter acquisition unit 74 that acquires the maximum diameter of an effective region of the point image P1 projected onto the light receiving surface 21 through the imaging lens 10; a determination unit 76 that determines whether or not the maximum diameter obtained in the point image diameter acquisition unit 74 is a size covering three or more pixels on the light receiving surface 21; and the restoration coefficient acquisition unit 78B that selects a restoration coefficient (for example, K1), which corresponds to a blur state of the point image P1 expressed by the blurred point image state data Db, among the restoration coefficient candidates K1, K2, . . . and makes the restoration coefficient K1 stored in the coefficient storage unit 30 when the determination unit 76 determines that the maximum diameter is a size covering three or more pixels on the light receiving surface 21.

In the restoration coefficient acquisition apparatus 70B, the point image diameter acquisition unit 74 acquires the maximum diameter of the effective region of the point image P1 projected onto the light receiving surface 21 through the imaging lens 10 and outputs diameter data Dm indicating the maximum diameter to the determination unit 76. The determination unit 76 to which the diameter data Dm has been input determines whether or not the maximum diameter is a size covering three or more pixels on the light receiving surface 21 and outputs a signal Te, which indicates that the maximum diameter is a size covering three or more pixels, to the restoration coefficient acquisition unit 78B when it is determined that the maximum diameter is a size covering three or more pixels. The restoration coefficient acquisition unit 78l3 to which the signal Te has been input selects a restoration coefficient (for example K1), which corresponds to a blur state of the point image P1 expressed by the blurred point image state data Db, among the restoration coefficient candidates K1, K2, . . . stored in the candidate coefficient storage unit 79 and makes coefficient data Dk indicating the restoration coefficient K1 output and stored in the coefficient storage unit 30.

That is, a restoration coefficient (for example, K1) selected corresponding to a blur state of a point image expressed by the first image data G1 among the candidates K1, K2, . . . of each restoration coefficient corresponding to each of blur states of point images classified into a plurality of types is stored in the coefficient storage unit 30.

On the other hand, as shown in FIG. 13, the restoration coefficient acquisition apparatus 70C of the third example includes: a candidate coefficient storage unit 79 that stores candidates K1, K2, . . . of each restoration coefficient corresponding to each of blur states of point images classified into a plurality of types beforehand; an ideal point image storage unit 72 that stores data Dr, which is either ideal point image state data or design data regarding an ideal point image projected onto the light receiving surface 21 through an imaging lens with high resolving power, beforehand when the resolving power of the imaging lens 10 is high; a point image blur state acquisition unit 73 that analyzes a blur state of a point image expressed by the first image data G1 output from the imaging device 20, acquires blurred point image state data Db indicating the analysis result, and outputs the blurred point image state data Db to a restoration coefficient acquisition unit 78C to be described later; a point image diameter acquisition unit 74 that acquires the maximum diameter of an effective region of the point image P1 projected onto the light receiving surface 21 through the imaging lens 10; and a determination unit 76 that determines whether or not the maximum diameter obtained in the point image diameter acquisition unit 74 is a size covering three or more pixels on the light receiving surface 21.

In addition, the restoration coefficient acquisition apparatus 70C includes the restoration coefficient acquisition unit 78C that selects a restoration coefficient (for example, K1), which corresponds to a blur state of the point image P1 expressed by the blurred point image state data Db output from the point image blur state acquisition unit 73, among the restoration coefficient candidates K1, K2, . . . , acquires coefficient data Dk (K1") indicating correction-completed restoration coefficient K1" obtained by correcting the restoration coefficient K1 by an operation using the blurred point image state data Db and the data Dr which is ideal point image state data or design data of a point image stored beforehand in the ideal point image storage unit 72, and makes the correction-completed restoration coefficient K1" indicated by the coefficient data Dk (K1") stored in the coefficient storage unit 30 when the determination unit 76 determines that the maximum diameter is a size covering three or more pixels on the light receiving surface 21.

In the restoration coefficient acquisition apparatus 70C, the point image diameter acquisition unit 74 acquires the maximum diameter of the effective region of the point image P1 projected onto the light receiving surface 21 through the imaging lens 10 and outputs diameter data Dm indicating the maximum diameter to the determination unit 76. The determination unit 76 to which the diameter data Dm has been input determines whether or not the maximum diameter is a size covering three or more pixels on the light receiving surface 21 and outputs a signal Te, which indicates that the maximum diameter is a size covering three or more pixels, to the restoration coefficient acquisition unit 78B when it is determined that the maximum diameter is a size covering three or more pixels. The restoration coefficient acquisition unit 78B to which the signal Te has been input selects a restoration coefficient (for example, K1), which corresponds to a blur state of the point image P1 expressed by the blurred point image state data Db, among the restoration coefficient candidates K1, K2, . . . stored in the candidate coefficient storage unit 79, acquires correction-completed restoration coefficient K1' obtained by correcting the restoration coefficient K1 by an operation using the blurred point image state data Db and the data Dr which is ideal point image state data or design data of a point image stored beforehand in the ideal point image storage unit 72, and makes the correction-completed restoration coefficient K1' stored in the coefficient storage unit 30.

That is, the correction-completed restoration coefficient K1' obtained by correcting a restoration coefficient (for example, K1), which is selected corresponding to a blur state of the point image P1 expressed by the first image data G1 among a plurality of kinds of restoration coefficient candidates corresponding to each of blur states of point images classified into a plurality of types, according to a blur state of the point image is stored in the coefficient storage unit 30.

In addition, the imaging system 200 may include the restoration coefficient acquisition apparatus 70A, 70B, or 70C as a part thereof or may not include any of the restoration coefficient acquisition apparatuses 70A, 70B, and 70C.

In addition, an imaging system 200' shown in FIG. 14 includes a restoration coefficient acquisition apparatus 70, which has the same function as the restoration coefficient acquisition apparatus 70A, 70B, or 70C, provided in a housing of the imaging system. The imaging system may be constructed in this way.

In addition, an imaging system 200" shown in FIG. 15 includes the above-described restoration coefficient acquisition apparatus 70 and coefficient storage unit 30 provided in a signal processing unit 40'. The imaging system may be configured in this way.

<Regarding the Performance of an Imaging System>

Next, an imaging system configured to include the imaging lens 10 and the imaging device 20 used in the above imaging system 200 may have the same performance as in the first embodiment.

As described above, according to the imaging system of the second embodiment of the invention, when the resolution of an image expressed by the first image data output from the imaging system does not reach an intended level, it is not necessary to specify the cause and readjust or reassemble the imaging lens unlike the related art. That is, second image data that expresses an image having an intended resolution can be obtained only by storing a restoration coefficient corresponding to a blur state of a point image in a coefficient storage unit and performing restoration processing on the first image data. As a result, the quality of image data obtained by imaging an optical image projected onto the light receiving surface can be easily improved. In addition, it can be said that lack of the resolving power in an imaging system can be recovered easily.

<Modification of Each Constituent Element>

Hereinafter, modifications of constituent elements in the imaging system of the second embodiment will be described.

In addition, the signal processing unit may execute the restoration processing with a pixel region, which includes the whole effective region but is not the minimum, as a minimum unit without being limited to a case where the restoration processing is executed in a state where a minimum pixel region including the entire effective region of a point image projected onto a light receiving surface is set as a minimum unit.

Furthermore, the signal processing unit may execute the restoration processing such that the size of an effective region of a point image in an image expressed by first image data is equal to or larger than the size of an effective region of a point image in an image expressed by second image data without being limited to a case where the restoration processing is executed such that the size of the effective region of the point image in the image expressed by the second image data is smaller than the size of the effective region of the point image in the image expressed by the first image data.

Moreover, in apparatuses requested to have a large depth of field, such as an imaging apparatus, a portable terminal apparatus, an onboard apparatus, and a medical apparatus of the invention including the above-described imaging system, the quality of image data obtained by imaging an optical image projected onto the light receiving surface of the imaging system provided in each apparatus can be easily improved as described above.

In addition, in the imaging system of the invention, the imaging lens and the imaging device may be constructed such that the maximum diameter of an effective region of a point image, which is projected onto a light receiving surface from any position of X, Y, and Z directions of an object space within a range which is restricted to, for example, 10 f or more in the Z direction and is restricted up to an intended object height in the X and Y directions, becomes a size covering three or more pixels of light receiving pixels which form the light receiving surface of the imaging device.

In addition, the imaging lens is preferably constructed such that a value of MTF characteristics of an optical image of a subject, which is projected onto a light receiving surface through the imaging lens from any position of X, Y, and Z directions which is distant by ten times or more of a focal length of the imaging lens, is a positive value. In addition, the "position distant ten times or more of a focal length of an imaging lens" means a "position distant ten times or more of the focal length toward the subject along the optical-axis direction (Z-axis direction) of the imaging lens from a reference position when a position, at which one of lens surfaces forming the imaging lens closest to the subject side (object side) and the optical axis of the imaging lens cross each other, is set as the reference position".

In addition, the imaging system may also be constructed such that the maximum diameter of an effective region only in a point image, which is projected onto a light receiving surface through an imaging lens from a position at which the imaging lens and the imaging device are limited in at least one of the X, Y, and Z directions, becomes a size covering three or more pixels of light receiving pixels which form the light receiving surface. In such a case, the second image data may be obtained by executing the restoration processing only on the first image data indicate a region where the maximum diameter of an effective region of a point image projected onto the light receiving surface is a size covering three or more pixels of light receiving pixels.

In apparatuses requested to have a large depth of field, such as an imaging apparatus, a portable terminal apparatus, an onboard apparatus, and a medical apparatus of the invention including the imaging system according to the first or second embodiment, the quality of image data obtained by imaging an optical image projected onto the light receiving surface of the imaging system provided in each apparatus can be easily improved as described above.

Furthermore, the imaging systems according to the first and second embodiments may be constructed such that an optical image of a subject is projected onto a light receiving surface only through an optical member having an axisymmetric shape or the optical image of the subject is projected onto the light receiving surface through an optical member having a non-axisymmetric shape. In addition, it is preferable that the imaging lens have a large depth of field. That is, it is preferable to construct the imaging lens and the imaging device such that a change in a blur state of a point image projected onto a light receiving surface is decreased even if a change in a state where an optical image of a subject is projected onto the light receiving surface occurs due to the movement of the subject or focus adjustment of the imaging lens, for example. More specifically, it is preferable to construct the imaging lens and the imaging device such that changes in size and contrast of the effective region of the point image projected onto the light receiving surface are decreased. However, the imaging system may also be made to include an imaging lens having a small depth of field without being limited to a case in which the imaging system includes an imaging lens having a large depth of field.

In addition, the imaging device used in the imaging systems according to the first and second embodiments may be a CCD device or a CMOS device.

<Method of Manufacturing an Imaging System>

Hereinafter, a method of manufacturing the imaging system of the invention, that is, a method of manufacturing a restoration-coefficient-storage-completed imaging system in which storage of a restoration coefficient is completed by storing an intended restoration coefficient in an imaging system in which the intended restoration coefficient is not stored will be described with reference to FIGS. 11, 12, and 13.

In the method of manufacturing an imaging system, restoration-coefficient-storage-completed imaging systems 200A, 200B, . . . capable of executing restoration processing by storing a restoration coefficient in the coefficient storage unit 30 are manufactured.

In addition, the imaging systems 200A, 200B, . . . are equal to the imaging system 200 already described with reference to FIGS. 11 to 15.

The method of manufacturing an imaging system is a method of manufacturing the imaging systems 200A, 200B, . . . each of which executes restoration processing by using the restoration coefficient K stored in the coefficient storage unit 30 and includes: the imaging lens 10; the imaging device 20 which has the light receiving surface 21 on which a plurality of light receiving pixels are two-dimensionally arrayed and which forms an optical image of a subject projected onto the light receiving surface 21 through the imaging lens 10 and outputs the first image data G1 expressing the subject; the signal processing unit 40 that executes the restoration processing F on the first image data G1 in a state where a pixel region covering total nine pixels including three or more pixels in the vertical direction and three or more pixels in the horizontal direction on the light receiving surface 21 is set as a minimum unit, the restoration processing F being executed to generate the second image data G2 equivalent to the first image data G1 output from the imaging device 20 when the resolving power of the imaging lens 10 is high; and the coefficient storage unit 30 that stores the restoration coefficient K used in restoration processing.

In this manufacturing method, the point image P1 is projected onto the light receiving surface 21 through the imaging lens 10 and the restoration coefficient K corresponding to a state of the point image P1 expressed by the first image data G1 output from the imaging device 20 is stored in the coefficient storage unit 30.

As the method of manufacturing an imaging system, it is possible to adopt a method of calculating a restoration coefficient using the restoration coefficient acquisition apparatus 70A of the first example, the restoration coefficient acquisition apparatus 70B of the second example, or the restoration coefficient acquisition apparatus 70C of the third example in the second embodiment and storing the restoration coefficient in a coefficient storage unit of each of the imaging systems 200A, 200B, . . . .

Hereinafter, methods of manufacturing imaging systems using the restoration coefficient acquisition apparatus 70A of the first example, the restoration coefficient acquisition apparatus 70B of the second example, and the restoration coefficient acquisition apparatus 70C of the third example will be specifically described. In addition, since configurations and operations of the imaging systems 100A, 100B, . . . , restoration coefficient acquisition apparatus 70A of the first example, restoration coefficient acquisition apparatus 70B of the second example, and restoration coefficient acquisition apparatus 70C of the third example are similar to those in the imaging system 100, a repeated explanation will be omitted. Accordingly, a method of manufacturing an imaging system not overlapping the explanation on the imaging system 100 will be described.

<Method of Manufacturing an Imaging System Corresponding to the Restoration Coefficient Acquisition Apparatus 70A of the First Example>

In a manufacturing process of "1 to 1" correspondence for storing a restoration coefficient, which is individually calculated for every imaging system, in each imaging system, the following processes are needed.

(1) Point image measurement and determination on uniformity within a screen (2) Extraction of a coefficient group (restoration coefficient) using optimal restoration processing (3) Recording of an optimal coefficient group.

The functions explained in <Operations of a restoration coefficient acquisition apparatus> in the first embodiment may be applied as the respective functions.

<Method of Manufacturing an Imaging System Corresponding to the Restoration Coefficient Acquisition Apparatus 70B of the Second Example>

A second preferred method of manufacturing the point image correction optical system configured to include an imaging lens, an imaging device, and a signal processing circuit will be described. Here, a case of manufacturing a large number of digital cameras at low cost is assumed. In the manufacturing process, (1) building of a library of a coefficient (restoration coefficient) group used in restoration processing, (2) point image measurement and determination on uniformity within a screen, (3) extraction of a coefficient group allowing optimal restoration processing in the unit of a group from the library, and (4) recording of an optimal coefficient group in the unit of a group are needed. Each of the functions will be described in more detail.

In the process of (1), a number of imaging lenses (for example, ¹/₁₀ of all lots) enough to show the overall tendency are measured beforehand and resolution tendencies (malfunction tendencies) are divided into groups. Optimal restoration processing is performed on each of the groups and an optimal coefficient group in the unit of each group is acquired, thereby building a library. Although it is ideal to apply a coefficient group in the "1 to 1" correspondence like the first example, this is not suitable for a case of mass production or a case where cost reduction is needed. Therefore, the library in which the entire part is divided into intended groups and optimal solution in the group unit is calculated is created, like this example.

Although the process (2) is the same as the process (1) in the first example, it is determined that a measured point image will belong to which of the groups acquired in the process (1) in the second example. Practically, imaging lenses other than the imaging lenses measured beforehand are also divided into groups at the time of group division (for example, 9/10 of all lots).

The process (3) is a step of extracting an optimal coefficient group of the group determined in the process (2) from the library, and the selected coefficient group is applied to the set of "imaging lens+imaging device". In this case, an optimal coefficient group is not requested for each set of "imaging lens+imaging device". Since this shortens the operation time required in the first example, mass production can be realized at low price.

The process (4) is the same as the process (3) in the first example.

<Method of Manufacturing an Imaging System Corresponding to the Restoration Coefficient Acquisition Apparatus 70C of the Third Example>

A third preferred method of manufacturing the point image correction optical system configured to include an imaging lens, an imaging device, and a signal processing circuit will be described. Here, a case of manufacturing a large number of digital cameras at low cost is assumed. In the manufacturing process, (1) building of a library of a coefficient (restoration coefficient) group used in restoration processing, (2) point image measurement and determination on uniformity within a screen, (3) extraction of a coefficient group allowing optimal restoration processing from the library, (4) partial modification of the corresponding coefficient group, and (5) recording of the modified coefficient group are needed. Each of the functions will be described in more detail.

The processes (1), (2), and (3) are the same as the processes (1), (2), and (3) in the second example.

The process (4) is a process of partially modifying in which the extracted coefficient group. Although the coefficient group is an arrangement of certain numbers, a modification needed for certain "imaging lens+imaging device" is made by correcting only a part thereof. Since coefficients are partially modified unlike the first example in which all coefficient groups are optimized, the modification is completed in a short time.

The process (5) is a step of recording the corrected coefficient group that has been modified, and a set of "imaging lens+imaging device+recording medium" is thus formed.

Thus, the imaging system manufactured by using the method of manufacturing an imaging system of the invention can easily improve the quality of image data obtained by imaging an optical image projected onto a light receiving surface.

<Regarding Lens Configuration and Operation of an Imaging Lens>

Next, configuration and operation of an imaging system of the first example used in the above imaging systems 100 and 200 will be described in detail. An imaging lens 10A, which will be described later, used in the imaging system of the first example becomes an example of the imaging lens 10 described above.

Furthermore, as described above, the imaging lens 10 has a first lens group G-1 which includes at least one lens and has positive power, and a second lens group G-2 which includes at least one lens and has positive power, in order from a subject side (object side).

<Regarding an Imaging System of Example 1>

Figure 16:
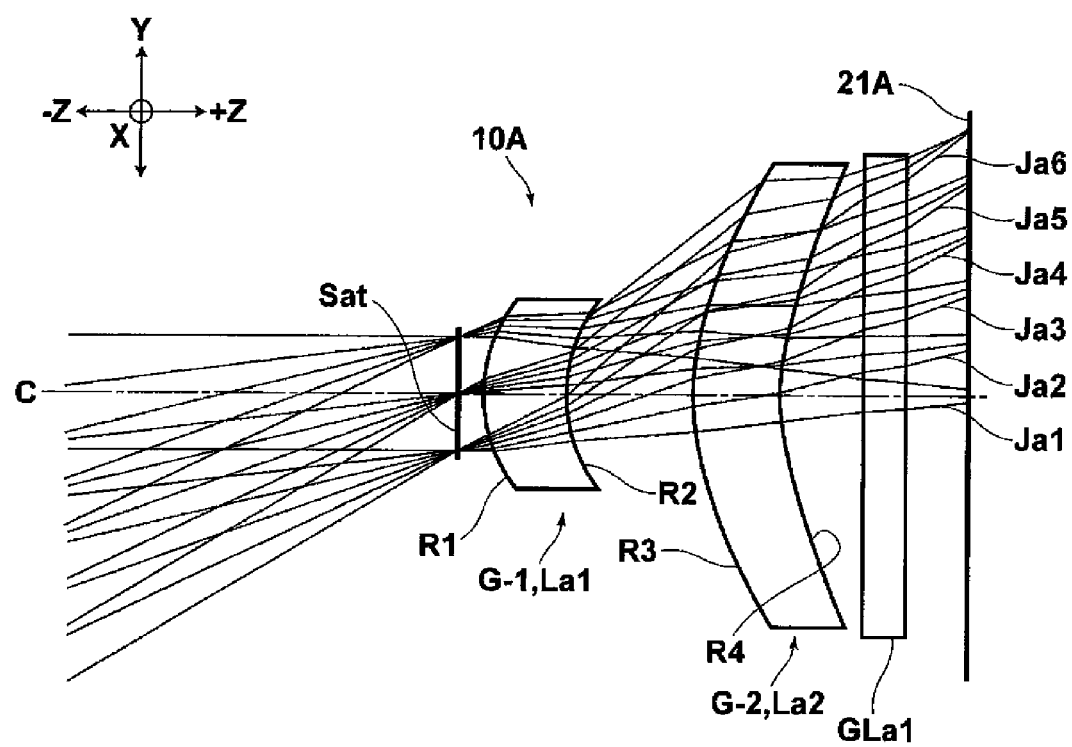
FIG. 16 is a cross-sectional view showing a schematic configuration of an imaging lens disposed in an imaging system of Example 1.

FIG. 16 is a cross-sectional view showing the schematic configuration of an imaging lens 10A including three single lenses in Example 1. FIGS. 17A to 17D are views showing a change in a value (%) of MTF characteristics of an optical image projected onto a light receiving surface when the light receiving surface is defocused with respect to the imaging lens onto the coordinates in which the horizontal axis indicates a defocus amount Ud (μm) in the optical-axis direction (Z-axis direction) of the light receiving surface onto which an image of a subject is projected through the imaging lens 10A and the vertical axis indicates the value (%) of MTF characteristics. Here, a defocus range of a light receiving surface 21A is 400 μm.

Figure 17A:
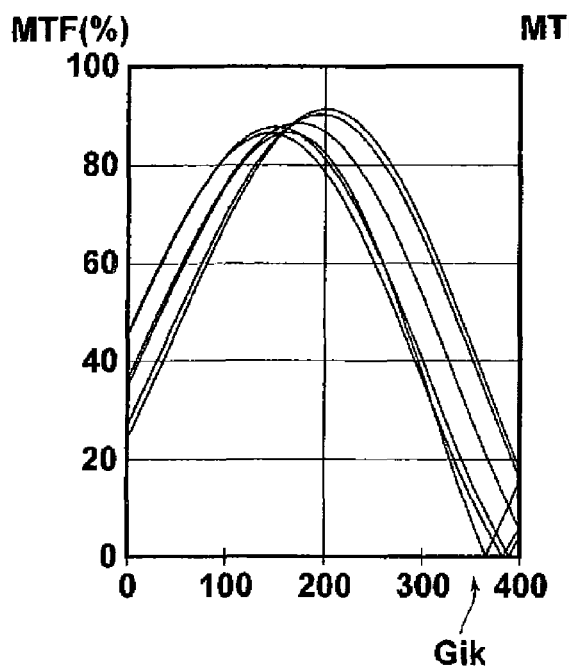
FIGS. 17A to 17D are views illustrating a change in a value of MTF characteristics when a light receiving surface is defocused, specifically.
Figure 17B:
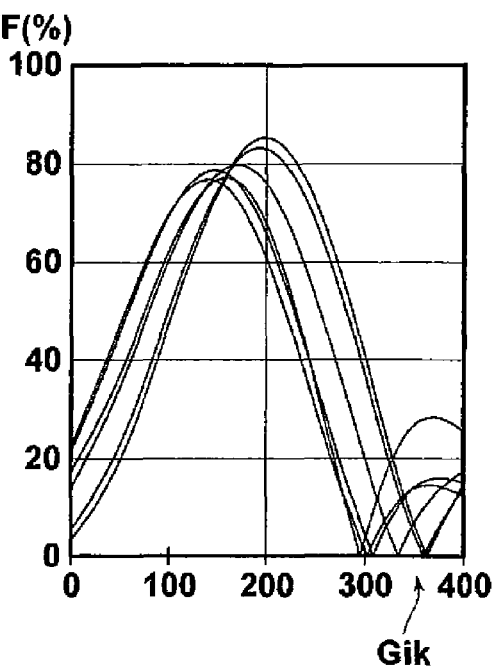
Figure 17C:
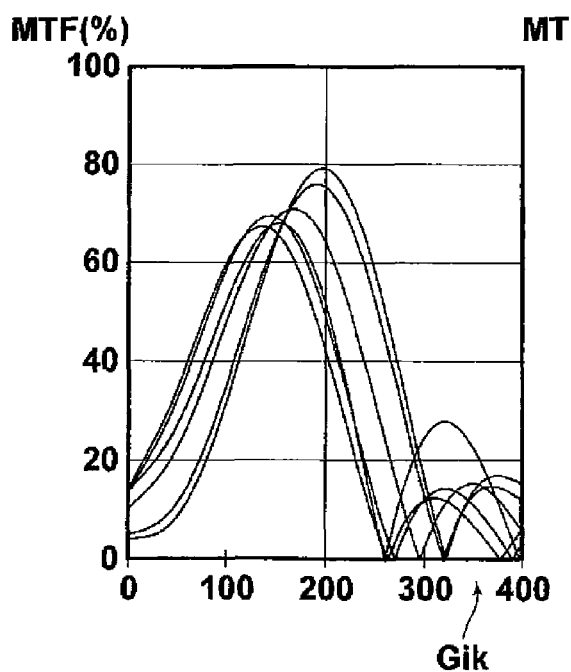
Figure 17D:
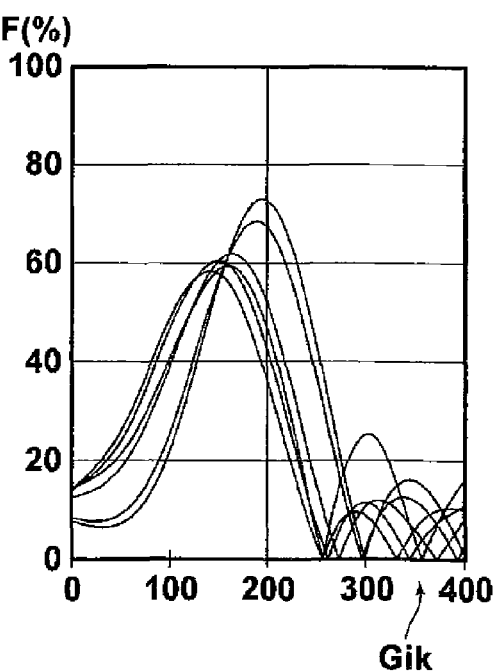

More specifically, FIGS. 17A to 17D are views showing a change in the value (%) of MTF characteristics regarding optical images projected at various image heights when the light receiving surface 21A is defocused in a state where the position of the subject with respect to the imaging lens 10A is fixed. FIG. 17A shows a change in a value of MTF characteristics in a spatial frequency of 20 line/mm, FIG. 17B shows a change in a value of MTF characteristics in a spatial frequency of 30 line/mm, FIG. 17C shows a change in a value of MTF characteristics in a spatial frequency of 40 line/mm, and FIG. 17D shows a change in a value of MTF characteristics in a spatial frequency of 50 line/mm.

In addition, for a horizontal axis Ud indicating the defocus amount shown in FIGS. 17A to 17D, a direction (direction in which a value of Ud approaches 400 μm) in which the value increases indicates a direction in which the imaging lens and the light receiving surface become distant from each other and a direction (direction in which the value of Ud approaches 0) in which the value decreases indicates a direction in which the imaging lens and the light receiving surface become close to each other.

As shown in FIG. 16, the imaging lens 10A has an aperture diaphragm Sat, a first single lens La1 corresponding to the first lens group G-1, a second single lens La2 corresponding to the second lens group G-2, and an optical member GLa1 which are arrayed in order from a subject side (side of −Z direction indicated by arrow in the drawing) along the optical axis C (Z axis). In addition, lens surfaces R1 and R3 shown in FIG. 16 indicate incidence-side surfaces of the single lenses La1 and La2, and lens surfaces R2, R4, and R6 indicate emission-side surfaces of the single lenses La1 and La2. An optical image of a subject is projected onto the light receiving surface 21A through the imaging lens 10A.

In addition, it is preferable to dispose a cover glass, a low pass filter, or an IR cut filter on the subject side of the light receiving surface 21A according to the configuration of an imaging system. In consideration of this, an example in which the optical member GLa1 that does not have power and has a parallel plate shape is disposed is shown in FIG. 16. In addition, the aperture diaphragm Sat does not indicate the shape or the size but indicates the position on the optical axis Z.

Furthermore, in FIG. 16, seven light beams Ja1, Ja2, Ja3, Ja4, Ja5 and Ja6 are shown in order of small image height from the on-axis light beam Ja1 to the off-axis light beam Ja6 incident at a maximum angle of view.

In addition, six MTF curves Mta20 shown in FIG. 17A indicate a change in a value of MTF characteristics in a spatial frequency of 20 Line/mm at each position where the six light beams are projected onto the light receiving surface 21A. Six MTF curves Mta30 shown in FIG. 17B indicate a change in a value of MTF characteristics in a spatial frequency of 30 Line/mm at each position similar to that described above, six MTF curves Mta40 shown in FIG. 17C indicate a change in a value of MTF characteristics in a spatial frequency of 40 Line/mm at each position similar to that described above, and six MTF curves Mta50 shown in FIG. 17D indicate a change in a value of MTF characteristics in a spatial frequency of 50 Line/mm at each position similar to that described above.

In addition, although an example in which the optical member GLa1 is disposed between the second single lens La2 and the light receiving surface 21A is shown in the configuration example of FIG. 16, a low pass filter or various kinds of filters which cut a specific wavelength region may be disposed between lenses. Alternatively, surface treatment (coating) having the same operation as various filters may be performed on a lens surface of one of the first single lens La1 to the second single lens La2.

The imaging lens 10A has the first lens group La1 which is the first lens group G-1 having positive power, and the second lens group La2 which is the second lens group G-2 having positive power, in order from the object side.

In addition, the single lens La1 that forms the first lens group G-1 has a meniscus shape toward a convex surface on the object side, and the second lens La2 that forms the second lens group G-2 has a meniscus shape toward a convex surface on the object side.

Hereinafter, design data of the imaging lens 10A in Example 1 will be described.

Lens data and various kinds of data are shown in Table 1, coefficients of aspheric expression of each aspheric surface are shown in Table 2, and approximate specification of the imaging lens 10A is shown in Table 3.

TABLE 1

Example 1 (two lenses)

| Surface number | Ri | Di | Ndj | vdj |
|---|---|---|---|---|
| Aperture diaphragm | ∞ | 0.150 | | |
| 1* | 0.992 | 0.597 | 1.53105 | 55.56 |
| 2* | 1.465 | 0.859 | | |
| 3* | 1.571 | 0.623 | 1.53105 | 55.5 |
| 4* | 1.860 | 0.567 | | |
| 5 | ∞ | 0.300 | 1.51680 | 64.2 |
| 6 | ∞ | 0.430 | | |
| Image surface | ∞ | 0.000 | | |

| Focal length | 3.011 |
|---|---|
| F number | 4.0 |

TABLE 2

Example 1 (two lenses)

| Surface number | K | A3 | A4 | A5 | A6 |
|---|---|---|---|---|---|
| 1 | −8.10154480 | −0.04801866 | 1.58637650 | −3.08787130 | 2.99284350 |
| 2 | −32.62857110 | 0.20192561 | −0.04485772 | 3.33250150 | −5.14303230 |
| 3 | 0.85130150 | 0.14688718 | −0.46322196 | 0.18879620 | 0.34643314 |
| 4 | 0.90619780 | 0.05780352 | −0.09935381 | −0.09135401 | 0.12084680 |

| Surface number | A7 | A8 | A9 | A10 | A11 |
|---|---|---|---|---|---|
| 1 | 3.85037010 | −9.07367540 | −4.11197670 | −1.43599540 | 17.79467100 |
| 2 | −6.51213830 | 6.39789450 | 27.72069900 | −16.16441900 | 2.65570010 |
| 3 | −0.49611834 | 0.12958528 | 0.09606259 | −0.0302918 | −0.00106084 |
| 4 | −0.00513791 | −0.09143799 | 0.05916884 | −0.00734472 | 0.00001561 |

| Surface number | A12 | A13 | A14 | A15 | A16 |
|---|---|---|---|---|---|
| 1 | 33.01863600 | 16.33352800 | −80.22587700 | −200.00264000 | 263.81876000 |
| 2 | −19.58215700 | −47.36203800 | −41.18153600 | 48.33239800 | 133.18643000 |
| 3 | −0.00135727 | −0.00125600 | −0.00072505 | 0.00002502 | 0.00091066 |
| 4 | −0.00035057 | −0.00029207 | −0.00015275 | −0.00003419 | 0.00003222 |

| Surface number | A17 | A18 | A19 | A20 |
|---|---|---|---|---|
| 1 | Coefficients of A17 or later are not used in the | | | |
| 2 | surface numbers 1 and 2. | | | |
| 3 | −0.00008078 | −0.00006389 | −0.00003227 | 0.00000835 |
| 4 | 0.00001864 | 0.00001417 | 0.00000347 | −0.00000683 |

TABLE 3

Example 1
F number 4.0/Focal length 3.011 mm
Two-lens construction

| Maximum diameter Dmax (μm) of an effective region of a point image | Number of pixels Ngs corresponding to the maximum diameter Dmax of an effective region of a point image, which is converted for each pixel pitch of each pixel region | | | Shortest taking distance Sk (mm) | Focal length Sd (μm) |
|---|---|---|---|---|---|
| | Pixel pitch Pg = 2.2 μm conversion | Pixel pitch Pg = 1.85 μm conversion | Pixel pitch Pg = 1.4 μm conversion | | |
| 7 | 3.2 | 4.0 | 5.0 | 15f | 250 |

As shown below the lens data of Table 1, the focal length f of the imaging lens 10A is 3.011 mm and the F number is 4.0.

In the lens data of Table 1, the surface number indicates an i-th surface number (i=1, 2, 3, . . . ) increasing sequentially toward the image side with a lens surface positioned closest to the subject side as a first lens surface. Moreover, in Table 1, a surface number (i=5, 6) of the optical member GLa1 is also described since the aperture diaphragm Sat and the optical member GLa1 are described together.

"Ri" of Table 1 indicates a paraxial radius of curvature of the i-th surface (i=1, 2, 3, . . . ), and "Di" indicates a surface spacing between the i-th (i=1, 2, 3, . . . ) surface and the (i+1)-th surface on the optical axis Z. In addition, "Ri" of Table 1 corresponds to the reference numeral Ri (i=1, 2, 3, . . . ) in FIG. 16.

Ndj of Table 1 indicates a refractive index of a j-th (j=1, 2, 3, . . . ) optical element at the d-line (wavelength of 587.6 nm), the j-th number (j=1, 2, 3, . . . ) increasing sequentially toward the image side with an optical element positioned closest to the subject side as a first optical element. In addition, vdj of Table 1 indicates the Abbe number of the j-th optical element at the d-line. In Table 1, the units of paraxial radius of curvature and on-axis surface spacing is mm. In the case of the paraxial radius of curvature, a case in which the subject side is convex is positive and a case in which the image side is convex is negative.

In the lens data of Table 1, an aspheric surface has a surface number added with * mark. Each aspheric surface is defined by the following aspheric expression.

$$Z = \frac{Y^2/R}{1 + (1 - K \cdot Y^2/R^2)^{1/2}} + \sum_{i=3}^{20} AiY^i$$

Z: Aspheric depth (length of a perpendicular line from a point with the height Y on an aspheric surface to a plane perpendicular to an optical axis with which an aspheric apex is in contact)

Y: height (distance from an optical axis)

R: paraxial radius of curvature

K, Ai: aspheric coefficient (i=3 to 20)

Values of coefficients K, A3, A4, A5, . . . of each aspheric surface in the aspheric expression are shown in Table 2.

In each of the single lenses La1 and La2 that form the imaging lens 10A, both an incidence-side lens surface and an emission-side lens surface have aspheric shapes.

In addition, Table 3 shows the relationship among a maximum diameter Dmax of an effective area of a point image, the number of pixels (number of pixel regions) Ngs corresponding to the maximum diameter Dmax of the effective area of the point image, a shortest taking distance Sk, and a focal depth Sd in the imaging system of Example 1.

In addition, the pixel number Ngs in Table 3 indicates the number of pixel regions corresponding to the maximum diameter of an effective region of a point image for each pixel pitch Pg (2.2 μm, 1.85 μm, 1.4 μm) in a pixel region on a light receiving surface. Here, a value of the pixel number Ngs is calculated by expression of "pixel number Ngs=maximum diameter Dmax/pixel pitch Pg".

The maximum diameter Dmax of the effective area of the point image is a diameter of the effective area of the point image in a direction in which the effective region of the point image includes a largest number of pixels, and the pixel pitch Pg is a pitch between pixel regions (light receiving pixels) in the direction.

The shortest taking distance Sk is a recommended value when an imaging lens is supplied for practical use and indicates a shortest distance from an imaging lens, which can project an image of a subject onto a light receiving surface with desired resolution, to the subject. This shortest distance is expressed as a distance (taking distance) from a lens surface (here, the lens surface R1), which is positioned closest to a subject side (object side) of the imaging lens, to a subject.

This shortest taking distance is included in a range of a taking distance allowing to obtain an effect in which the quality of image data obtained by imaging an optical image projected onto the light receiving surface is improved by restoration processing.

Furthermore, in the imaging systems of Example 1, the range of the taking distance allowing to obtain an effect of improving the quality of image data by the restoration processing is a range of a taking distance from 0 to ∞ (point at infinity) and is an entire range in which a subject can be taken.

The focal depth Sd indicates a defocus range in which an image of a subject can be projected onto the light receiving surface with resolution equal to or larger than that defined when the light receiving surface is defocused in a state where the position of the subject with respect to the imaging lens is fixed. This focal depth Sd is a value considered to correspond to the range of the taking distance, in which a subject can be projected onto the light receiving surface with the intended resolution in a state where the position of the light receiving surface with respect to the imaging lens is fixed at an intended position, to some extent. That is, it is thought that a range of a taking distance in which a subject can be projected onto the light receiving surface with the intended resolution increases as a value of the focal depth Sd increases.

As can be seen from Table 3, the imaging system of Example 1 is constructed such that a maximum diameter of an effective region of a point image covers three or more pixel (3.2 pixels) when the effective region of the point image projected onto the light receiving surface 21A is 7 μm or more and the pixel pitch between light receiving pixels that form the light receiving surface 21A is 2.2 μm or less.

In addition, a value of the shortest taking distance Sk is 15 f (about 45.2 mm) when the maximum diameter Dmax of the effective region of the point image is set to 7 μm.

A value of the focal depth Sd of the imaging lens 10A is 250 μm when the maximum diameter Dmax of the effective region of the point image is set to 7 μm.

For a value of MTF characteristics regarding the imaging system of Example 1, when the light receiving surface 21A is made to be closest to the imaging lens 10A, that is, when a value of defocus amount Ud in FIGS. 17A to 17D is 0, all values of MTF characteristics in a spatial frequency of 20 to 50 Line/mm are positive values.

In addition, when the light receiving surface 21A is away from the imaging lens 10A, that is, when the value of defocus amount in FIGS. 17A to 17D is set to 250 μm, all values of MTF characteristics when the spatial frequency is 20 to 50 Line/mm are positive values.

That is, when the value of defocus amount is in a range of 0 to 250 μm, all values of MTF characteristics when the spatial frequency is 20 to 50 Line/mm are positive values.

In a range in which the value of defocus amount is 250 μm to 400 μm, the value of MTF characteristics in a spatial frequency of 20 to 50 Line/mm is inverted from 0% and false resolution occurs. The range in which the false resolution occurs is indicated by arrow Gik in the drawing.

Here, since it can be said that image data obtained by imaging an image of a subject projected onto a light receiving surface has optically meaningful information when the value of MTF characteristics regarding the image is larger than 0%, the image data may be subjected to restoration processing in order to improve the resolution. However, in the case where the value of MTF characteristics regarding the image of the subject projected onto the light receiving surface is 0% or is turned up from 0% to cause the false resolution to occur, image data obtained by imaging the image does not have optically meaningful information. Accordingly, even if the restoration processing is performed on such image data, it is not possible to improve the quality (resolution of an image expressed by the image data) of the image data.

Thus, according to the imaging system, the value of MTF characteristics of an image obtained by projecting a subject onto the light receiving surface 21A can always be set to a value larger than 0% (it is possible to prevent the false resolution from occurring) when a taking distance is made to change in a range of 15 f to ∞ in an intended state where the positional relationship between the light receiving surface 21A and the imaging lens 10A is fixed.

That is, an image of a subject projected onto the light receiving surface 21A in a range of a taking distance of 15 f to ∞ can be made as a meaningful image.

Moreover, since an effective region of a point image projected onto the light receiving surface 21A when the taking distance is made to change in the range of 0 to ∞ has a size covering three or more pixels on the light receiving surface 21A, the resolution of an image can be improved by executing the restoration processing on image data obtained by imaging a subject existing in this range.

That is, it can be said that image data obtained by imaging an image including various subjects, which are projected onto the light receiving surface 21A through the imaging system in Example 1 and exist in a range in which the taking distance is 15 f to ∞, satisfies a prerequisite (condition for improving the resolution) for executing the restoration processing.

In addition, the restoration processing can be more easily executed by suppressing a fluctuation in the size of a point image projected onto the light receiving surface 21A small. That is, even if an image projected onto the light receiving surface includes various subjects existing at different taking distances, for example, the restoration processing can be executed without changing a parameter in image data expressing a subject existing at any position if blur states of point images forming images of the subjects are equal. Thus, a burden of the signal processing unit that executes the restoration processing can be alleviated.

On the other hand, in the case of executing the restoration processing using the same parameter all the time, the resolution of an image expressing a corresponding subject can be similarly improved for image data expressing a subject existing at any position by executing the restoration processing if blur states of point images that form images of various subjects, which are projected onto the light receiving surface and exist at different taking distances, are equal. That is, by execution of the restoration processing, the resolution of an image can be improved uniformly over the entire image.

Thus, by designing the imaging lens 10A such that the focal depth of the imaging lens 10A is large, the resolution of the entire image expressed by image data obtained by imaging an image including various subjects, which are projected onto the light receiving surface 21A through the imaging lens 10A and exist in a range in which the taking distance is 15 f to ∞, by the restoration processing.

In addition, according to the imaging lens 10A designed as described above, an incidence angle of light incident on the light receiving surface 21A with respect to the light receiving surface 21A can be made small, that is, an imaging lens with good telecentricity can be obtained.

<Aberration of the Imaging Lens Described in Example 1>

Figure 18:
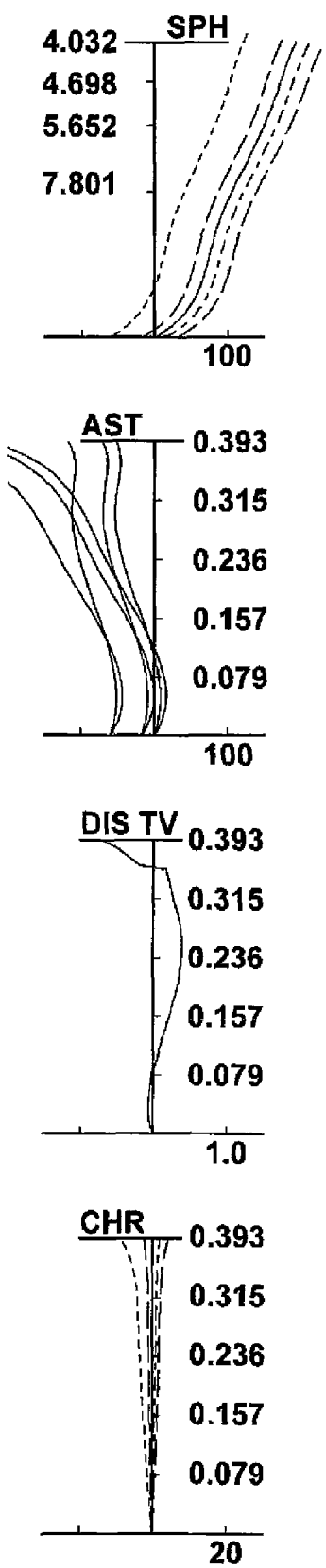
FIG. 18 is a view showing an aberration of an imaging lens in Example 1.

FIG. 18 is a view showing the aberration regarding the imaging lens 10A. Each of aberration figures of the imaging lens described in Example 1 shows spherical aberration, astigmatism, distortion, and lateral chromatic aberration in order from above in FIG. 13.

Although each aberration figure shows aberrations with the e line (wavelength of 546.07 nm) as a reference wavelength, aberrations with respect to the F line (wavelength of 486.1 nm) and the C line (wavelength of 656.3 nm) are also shown in the spherical aberration figure and the lateral chromatic aberration figure. The distortion figure shows an amount of deviation from an ideal image height when the ideal image height is set to f×tan θ using focal length f and half angle of view θ (variable; $0 \leq \theta \leq \omega$) of the whole system.

<Regarding an Imaging System of a Comparative Example>

Hereinafter, a known imaging lens used in a portable cellular phone camera and the like will be described as a comparative example.

Figure 19:
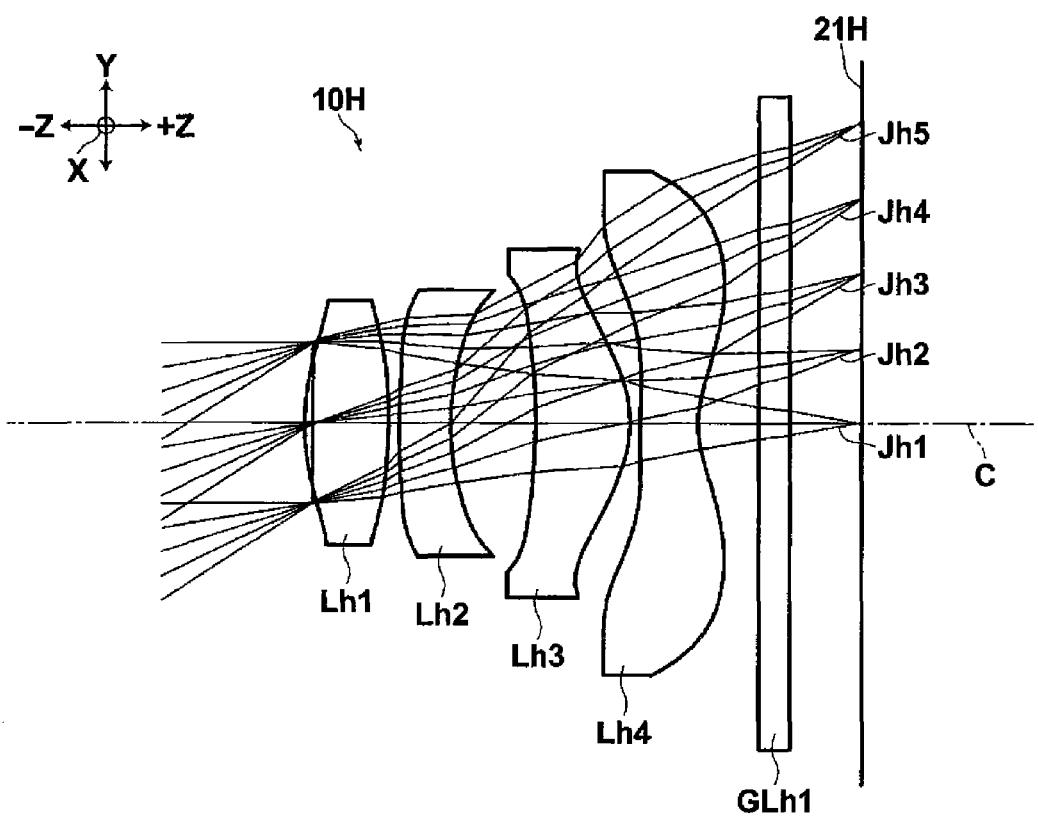
FIG. 19 is a cross-sectional view showing a schematic configuration of an imaging lens disposed in an imaging system in a comparative example.

FIG. 19 is a cross-sectional view showing the schematic configuration of an imaging lens including four single lenses in the comparative example. FIGS. 20A to 20D are views showing a change in a value (%) of MTF characteristics of an optical image projected onto a light receiving surface when the light receiving surface is defocused with respect to the imaging lens onto the coordinates in which the horizontal axis indicates a defocus amount Ud (μm) in the optical-axis direction (Z-axis direction) of the light receiving surface and the vertical axis indicates the value (%) of MTF characteristics. Here, a defocus range of the light receiving surface is 400 μm.

In addition, FIGS. 20A to 20D showing the MTF characteristics correspond to FIGS. 17A to 17D showing the MTF characteristics regarding the imaging lens 10A.

As shown in FIG. 19, an imaging lens 10H in the comparative example has a first single lens Lh1, a second single lens Lh2, a third single lens Lh3, a fourth single lens Lh4, and an optical member GLh1 which are arrayed in order from the subject side (side of −Z direction indicated by arrow in the drawing) along the optical axis C (Z axis). The imaging lens 10H having these four single lenses is designed such that the depth of field increases.

An optical image of a subject is projected onto the light receiving surface 21H through the imaging lens 10H.

The optical member GLh1 is an optical member which is formed of a parallel plate and does not have power.

Furthermore, in FIGS. 20A to 20D, five light beams Jh1, Jh2, Jh3, Jh4, and Jh5 are shown in order of small image height from the on-axis light beam Jh1 to the off-axis light beam Jh5 incident at a maximum angle of view.

Figure 20A:
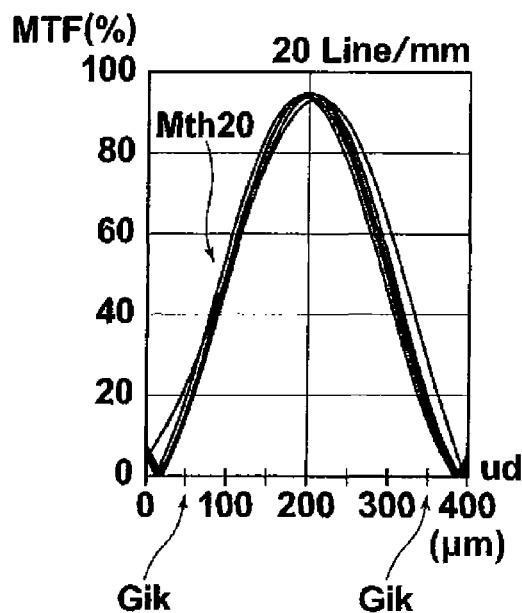
FIGS. 20A to 20D are views illustrating a change in a value of MTF characteristics when a light receiving surface is defocused, specifically.
Figure 20B:
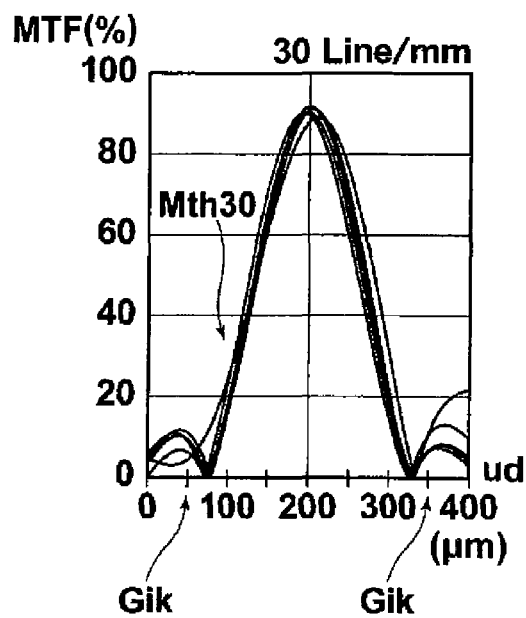
Figure 20C:
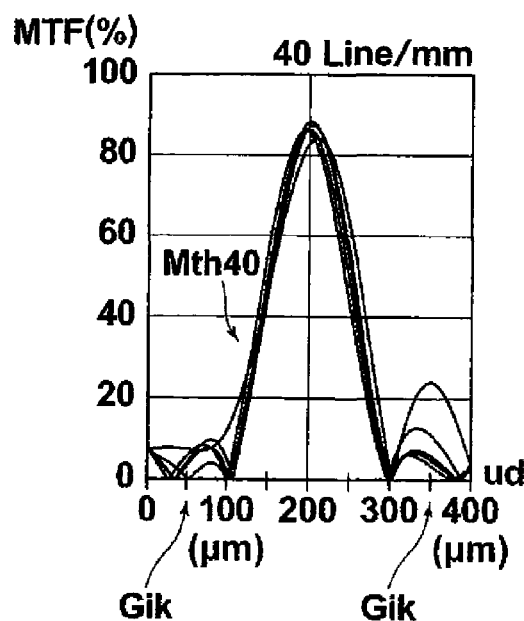
Figure 20D:
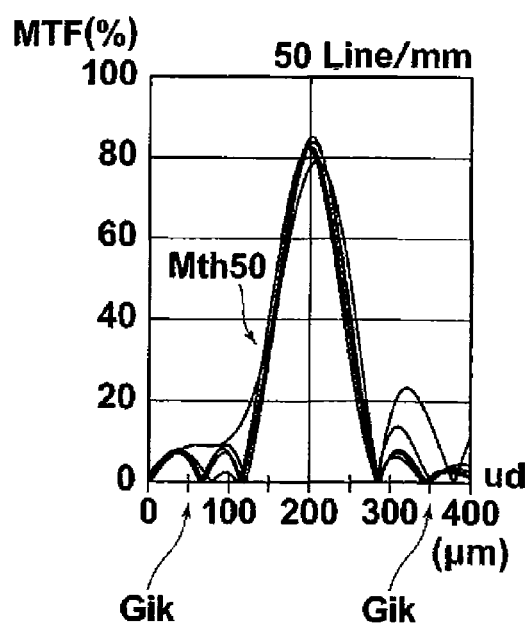

In addition, five MTF curves Mth20 shown in FIG. 20A indicate a change in a value of MTF characteristics in a spatial frequency of 20 Line/mm at each position where the five light beams are projected onto the light receiving surface 21H. Five MTF curves Mth30 shown in FIG. 20B indicate a change in a value of MTF characteristics in a spatial frequency of 30 Line/mm at each position similar to that described above, five MTF curves Mth40 shown in FIG. 20C indicate a change in a value of MTF characteristics in a spatial frequency of 40 Line/mm at each position similar to that described above, and five MTF curves Mth50 shown in FIG. 20D indicate a change in a value of MTF characteristics in a spatial frequency of 50 Line/mm at each position similar to that described above.

For the value of MTF characteristics in the imaging system of the comparative example, when the light receiving surface is made to be close to the imaging lens, that is, when a value of the defocus amount is in a range of approximately 0 to 120 μm in FIGS. 20A to 20D, the value of MTF characteristics in a spatial frequency of 30 to 50 Line/mm is inverted from 0%, resulting in a state where the false resolution occurs. The range in which the false resolution occurs is indicated by arrow Gik in the drawing.

In addition, when the light receiving surface is made to be close to the imaging lens, that is, when a value of the defocus amount is in a range of approximately 280 to 400 μm in FIGS. 20A to 20D, the value of MTF characteristics in a spatial frequency of 30 to 50 Line/mm is inverted from 0%, resulting in a state where the false resolution occurs. The range in which the false resolution occurs is indicated by arrow Gik in the drawing.

Here, the value of MTF characteristics in a range (range of a focal depth) in which a value of the defocus amount Ud is 120 μm to 280 μm is a positive value, and a range of fluctuation in value of MTF characteristics in each spatial frequency is about 85% (50 Line/mm), 90% (40 Line/mm), 70% (30 Line/mm), and 45% (20 Line/mm).

As described above, according to the imaging system in the comparative example, the value of MTF characteristics is a positive value only in a comparatively narrow defocus range (range of about 160 μm). Accordingly, the amount of fluctuation in the value of MTF characteristics is large.

In a defocus range (indicated by arrow Gik in the drawing) where the value of MTF characteristics is inverted from 0%, a point image has false resolution and an optically meaningful image which can be specified that the effective region covers three or more pixels cannot be obtained.

That is, only in a considerably limited range of a taking distance, the value of MTF characteristics is a positive value, that is, an image of a subject projected onto the light receiving surface can be made as a meaningful image. In addition, the amount of fluctuation in the size of a point image projected onto the light receiving surface is large.

Moreover, since the imaging system in the comparative example is not constructed such that an effective region of a point image projected onto the light receiving surface when changing the taking distance in a range of 0 to ∞ has a size covering three or more pixels on the light receiving surface, image data obtained through the imaging system does not satisfy a prerequisite (condition for improving the resolution) for executing the restoration processing.

For this reason, even if the restoration processing is performed on the image data obtained by imaging an image of a subject projected onto the light receiving surface 21H through the imaging system in the comparative example, an effect of improving the resolution of the image expressing the subject cannot be acquired.

Figure 21:
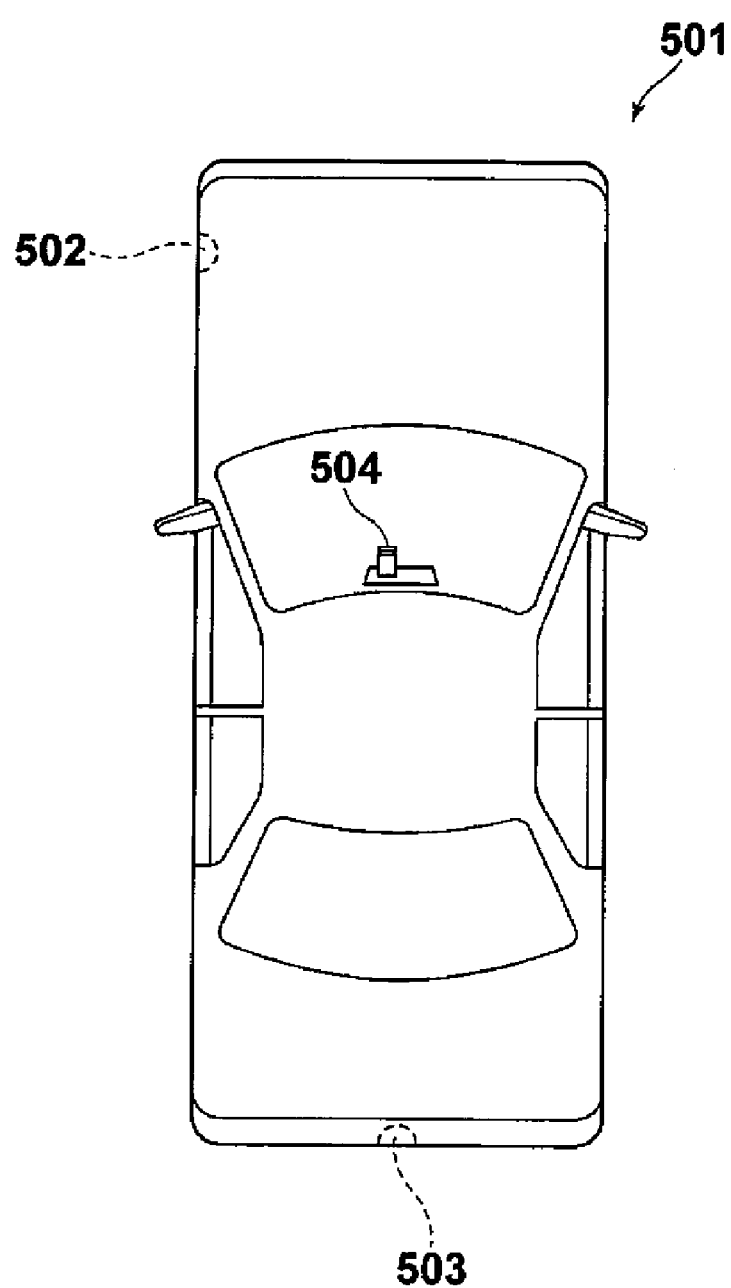
FIG. 21 is a view showing an automobile in which an onboard apparatus including an imaging system is mounted.

FIG. 21 is a view showing an automobile in which an onboard apparatus including an imaging system is mounted.

As shown in FIG. 21, onboard apparatuses 502 to 504 each including the imaging system of the invention may be used in a state mounted in an automobile 501 and the like. The automobile 501 includes: the onboard apparatus 502 which is a camera provided outside the vehicle in order to image a blind zone of a side surface on a front passenger side; the onboard apparatus 503 which is a camera provided outside the vehicle in order to image a blind zone on a rear side of the automobile 501; and the onboard apparatus 504 which is a camera attached to a back surface of a room mirror and provided inside the vehicle in order to image the same viewing field range as a driver.

Figure 22:
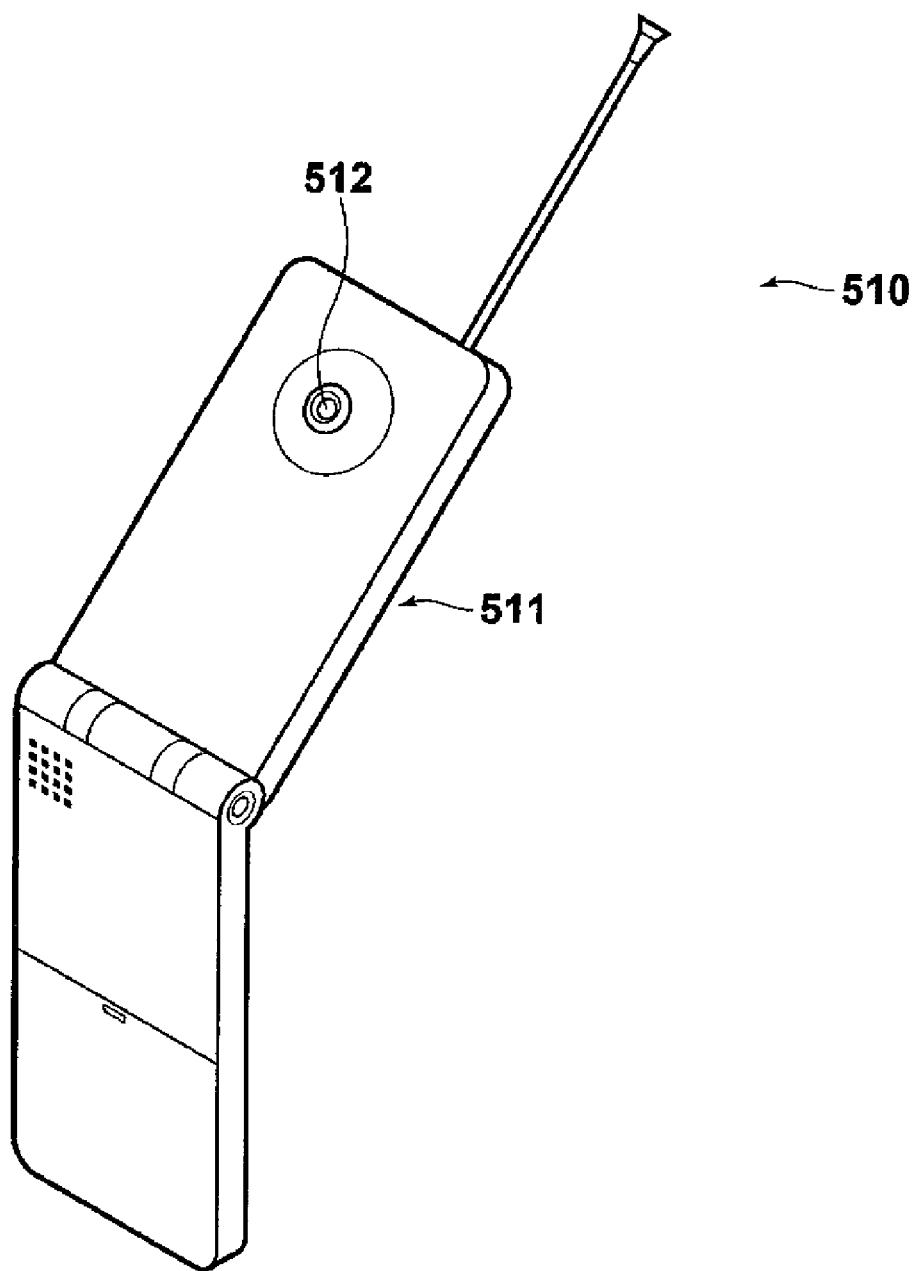
FIG. 22 is a view showing a portable cellular phone which is a portable terminal apparatus including an imaging system.

FIG. 22 is a view showing a portable cellular phone which is a portable terminal apparatus including an imaging system.

As shown in the drawing, a portable cellular phone 510 has an imaging system 512 provided in a housing 511 of the portable cellular phone.

Figure 23:
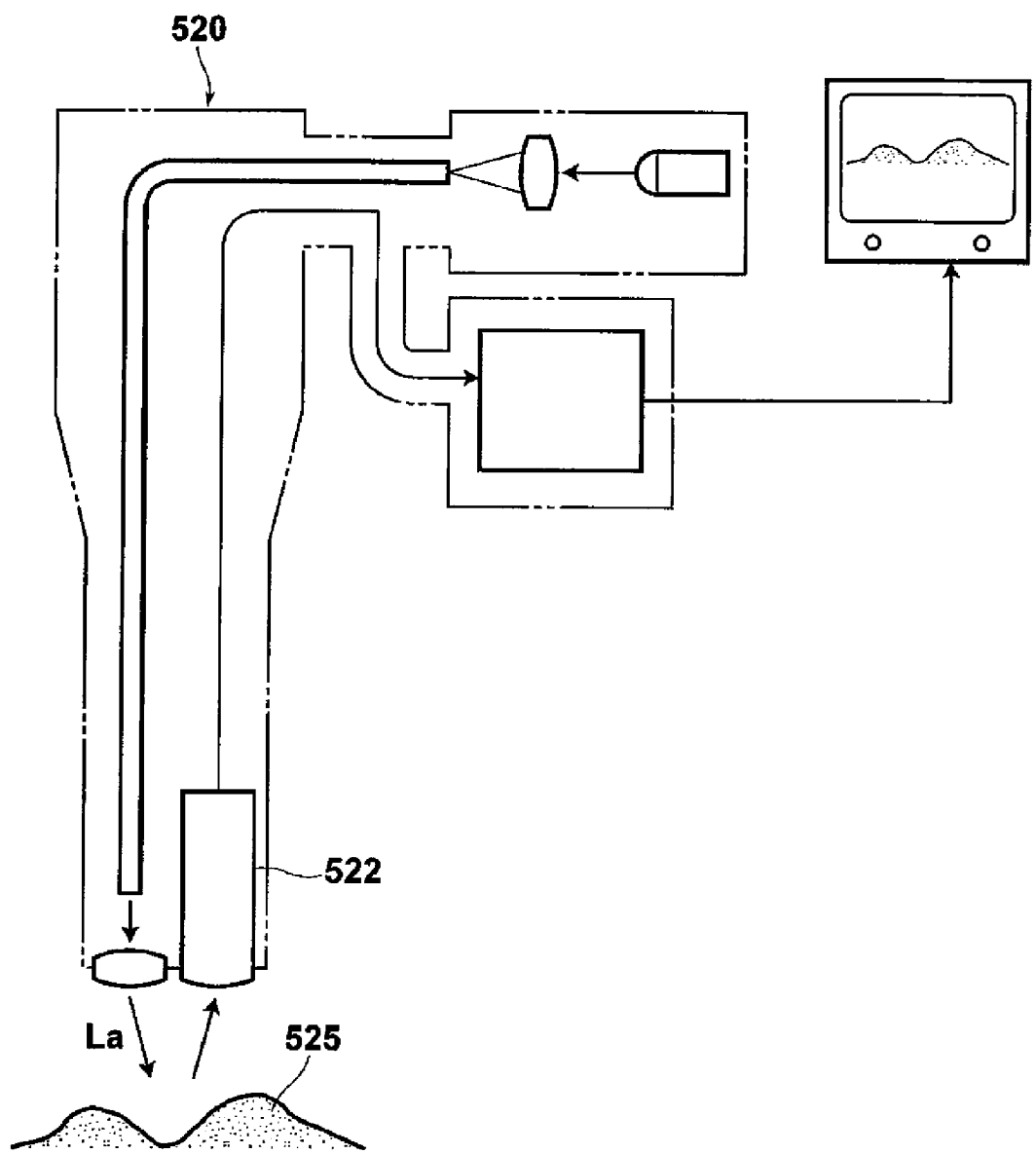
FIG. 23 is a view showing an endoscope apparatus which is a medical apparatus including an imaging system.

FIG. 23 is a view showing an endoscope apparatus which is a medical apparatus including an imaging system.

As shown in the drawing, an endoscope apparatus 520 that observes a biological tissue 525 has an imaging system 522, which is used to image the biological tissue 525 illuminated by illumination light La, provided on a front end 521 of the endoscope apparatus 520.

Thus, in the imaging apparatus, the portable terminal apparatus, the onboard apparatus, and the medical apparatus of the invention including the above-described imaging system, a known imaging system provided in an imaging apparatus, a portable terminal apparatus, an onboard apparatus, and a medical apparatus known from the past may be easily replaced. That is, the imaging apparatus, the portable terminal apparatus, the onboard apparatus, and the medical apparatus of the invention may be constructed by replacing the known imaging systems provided in the known apparatuses with the imaging system of the invention without changing the apparatus size, shape, and the like of the imaging apparatus, portable terminal apparatus, onboard apparatus, and medical apparatus known from the past.

In addition, cases in which imaging lenses are limited in various kinds of conditions have been described in the examples. However, since an imaging lens having a first lens group which includes at least one lens and has positive power, and a second lens group which includes at least one lens and has positive power, in order from the object side is used as the imaging lens in the imaging system of the invention, the number of lenses included in each group, the shapes of the lenses, and the like are not limited. For example, each group may be configured to include a plurality of lenses.

What is claimed is:

1. An imaging system comprising:
   an imaging lens;
   an imaging device that has a light receiving surface on which a plurality of light receiving pixels are two-dimensionally arrayed and that forms first image data based on an optical image of a subject projected onto the light receiving surface through the imaging lens and outputs the first image data corresponding to the subject; and
   a signal processing section that executes restoration processing on the first image data, the restoration processing being executed to generate second image data equivalent to the first image data output from the imaging device when the resolving power of the imaging lens is higher,
   wherein the imaging lens includes in order from an object side thereof a first lens group including at least one lens and having a positive power, and a second lens group including at least one lens and having a positive power, and
   wherein the imaging lens and the imaging device are constructed such that a maximum diameter of an effective region of a point image, which is projected onto the light receiving surface through the imaging lens from any position of X, Y, and Z directions, becomes a size covering three or more pixels of the light receiving pixels.

2. The imaging system according to claim 1, wherein the imaging lens is constructed such that a value of MTF characteristics is positive, wherein the MTF corresponds to an optical image of a subject, which is projected onto the light receiving surface through the imaging lens, and the subject is located at any position of X, Y, and Z directions distant ten times or more of a focal length from the imaging lens.

3. The imaging system according to claim 1, wherein the signal processing section performs the restoration processing in a condition where a pixel region covering total nine or more pixels including three or more pixels in a vertical direction and three or more pixels in a horizontal direction on the light receiving surface is set as a minimum unit.

4. The imaging system according to claim 1, wherein the signal processing section executes the restoration processing by utilizing a restoration coefficient corresponding to a state of the point image expressed by the first image data.

5. The imaging system according to claim 1, wherein the signal processing section executes the restoration processing with a minimum pixel region which includes an entire effective region of the point image projected onto the light receiving surface, as a minimum unit.

6. The imaging system according to claim 1, wherein the signal processing section executes the restoration processing such that the size of the effective region of the point image in an image expressed by the second image data is smaller than a size of an effective region of the point image in an image expressed by the first image data.

7. The imaging system according to claim 1, wherein the imaging lens includes two single lenses.

8. The imaging system according to claim 7, wherein
the single lens in the first lens group has a meniscus shape with a convex surface being toward the object side, and
the single lens in the second lens group has a meniscus shape with a convex surface toward the object side.

9. The imaging system according to claim 7, wherein
the single lens in the first lens group has a biconvex shape, and
the single lens in the second lens group has a meniscus shape with a convex surface toward the image side.

10. An imaging apparatus comprising an imaging system according claim 1.

11. A portable terminal apparatus comprising an imaging system according to claim 1.

12. An onboard apparatus comprising an imaging system according to claim 1.

13. A medical apparatus comprising an imaging system according to claim 1.

14. An imaging system comprising:
an imaging lens;
an imaging device that has a light receiving surface on which a plurality of light receiving pixels are two-dimensionally arrayed and that forms first image data based on an optical image of a subject projected onto the light receiving surface through the imaging lens and outputs the first image data expressing the subject;
a coefficient storage section that will store a restoration coefficient corresponding to a state of a point image, which is projected onto the light receiving surface through the imaging lens and is expressed by the first image data output from the imaging device, when a maximum diameter of an effective region of the point image is a size covering three or more pixels; and
a signal processing section that executes restoration processing on the first image data by using the restoration coefficient, the restoration processing being executed to generate second image data equivalent to the first image data output from the imaging device when the resolving power of the imaging lens is higher, wherein the signal processing section performs the restoration processing in a condition where a pixel region covering total nine or more pixels including three or more pixels in a vertical direction and three or more pixels in a horizontal direction on the light receiving surface is set as a minimum unit, and
wherein the imaging lens includes in order from an object side thereof, a first lens group including at least one lens and having a positive power, and a second lens group including at least one lens and having a positive power.

15. The imaging system according to claim 14, wherein the coefficient storage section will store the restoration individually calculated for each corresponding imaging system.

16. The imaging system according to claim 14, wherein the coefficient storage section will store a restoration coefficient which is selected corresponding to a state of the point image expressed by the first image data among candidates of restoration coefficients corresponding to respective states of point images classified into a plurality of types.

17. The imaging system according to claim 14, wherein the coefficient storage section will store a correction-completed restoration coefficient obtained by further correction of a restoration coefficient according to a state of the point image expressed by the first image data among candidates of a plurality of types of restoration coefficients corresponding to respective states of point images classified into a plurality of types.

18. The imaging system according to claim 14, further comprising: a restoration coefficient acquisition section that acquiring the restoration coefficient and stores the acquired restoration coefficient in the coefficient storage section.

19. The imaging system according to claim 14, wherein the signal processing section executes the restoration processing with a minimum pixel region which includes an entire effective region of the point image projected onto the light receiving surface, as a minimum unit.

20. The imaging system according to claim 14, wherein the signal processing section executes the restoration processing such that the size of the effective region of the point image in an image expressed by the second image data is smaller than a size of an effective region of the point image in an image expressed by the first image data.

21. The imaging system according to claim 14, wherein the imaging lens includes two single lenses.

22. The imaging system according to claim 21, wherein
the single lens in the first lens group has a meniscus shape with a convex surface being toward the object side, and
the single lens in the second lens group has a meniscus shape with a convex surface toward the object side.

23. The imaging system according to claim 21, wherein
the single lens in the first lens group has a biconvex shape, and
the single lens in the second lens group has a meniscus shape with a convex surface toward the image side.

24. An imaging apparatus comprising an imaging system according claim 14.

25. A portable terminal apparatus comprising an imaging system according to claim 14.

26. An onboard apparatus comprising an imaging system according to claim 14.

27. A medical apparatus comprising an imaging system according to claim 14.

28. An imaging system comprising:
an imaging lens;
an imaging device that has a light receiving surface on which a plurality of light receiving pixels are two-dimensionally arrayed and that forms first image data based on an optical image of a subject projected onto the light receiving surface through the imaging lens and outputs the first image data expressing the subject;

a coefficient storage section that stores a restoration coefficient corresponding to a state of a point image, which is projected onto the light receiving surface through the imaging lens and is expressed by the first image data output from the imaging device, when a maximum diameter of an effective region of the point image is a size covering three or more pixels; and a signal processing section that executes restoration processing on the first image data by using the restoration coefficient, the restoration processing being executed to generate second image data equivalent to the first image data output from the imaging device when the resolving power of the imaging lens is higher, wherein the signal processing section performs the restoration processing in a condition where a pixel region covering total nine or more pixels including three or more pixels in a vertical direction and three or more pixels in a horizontal direction on the light receiving surface is set as a minimum unit, and wherein the imaging lens includes in order from an object side thereof, a first lens group including at least one lens and having a positive power, and a second lens group including at least one lens and having a positive power.

29. A method of manufacturing an imaging system of claim 28, comprising projecting the point image onto the light receiving surface of the imaging device through the imaging lens to cause the coefficient storage section to store the restoration coefficient corresponding to a state of the point image expressed by the first image data output from the imaging device.

30. The method of manufacturing an imaging system according to claim 29, wherein the restoration coefficient is individually calculated for each corresponding imaging system.

31. The method of manufacturing an imaging system according to claim 29, wherein the restoration coefficient is selected corresponding to a state of the point image expressed by the first image data among candidates of each restoration coefficient corresponding to each of states of point images classified into a plurality of types.

32. The method of manufacturing an imaging system according to claim 29, wherein the restoration coefficient is obtained by further correction of the restoration coefficient according to a state of the point image expressed by the first image data, the restoration coefficient being selected corresponding to the state of the point image among candidates of a plurality of types of restoration coefficients corresponding to respective states of point images classified into a plurality of types.

* * * * *